US011166275B2

(12) United States Patent
Lee et al.

(10) Patent No.: US 11,166,275 B2
(45) Date of Patent: Nov. 2, 2021

(54) FLEXIBLE SEARCH SPACE CONFIGURATION AND OVERBOOKING HANDLING

(71) Applicant: QUALCOMM Incorporated, San Diego, CA (US)

(72) Inventors: Heechoon Lee, San Diego, CA (US); Jing Sun, San Diego, CA (US); Peter Gaal, San Diego, CA (US); Wanshi Chen, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 16/275,247

(22) Filed: Feb. 13, 2019

(65) Prior Publication Data

US 2019/0254025 A1    Aug. 15, 2019

Related U.S. Application Data

(60) Provisional application No. 62/631,438, filed on Feb. 15, 2018.

(51) Int. Cl.
*H04W 72/04* (2009.01)
*H04W 72/12* (2009.01)
*H04L 5/00* (2006.01)

(52) U.S. Cl.
CPC ....... *H04W 72/0446* (2013.01); *H04L 5/0053* (2013.01); *H04W 72/12* (2013.01); *H04L 5/0092* (2013.01)

(58) Field of Classification Search
CPC ................................................ H04W 72/0446
See application file for complete search history.

(56) References Cited

U.S. PATENT DOCUMENTS

2019/0215098 A1* 7/2019 Tiirola ................ H04L 25/0238
2020/0404669 A1* 12/2020 Seo ....................... H04W 76/27

OTHER PUBLICATIONS (3GPP TSG RAN WG1 Ad Hoc 1801 ,R1-1800550 Vancouver, Canada, Jan. 22-26, 2018, Agenda item:7.3.1.2; Source: Nokia, Nokia Shanghai Bell; Title: On reducing the PDCCH channel estimation and BD complexity in NR) (Year: 2018).*

(Continued)

*Primary Examiner* — Kodzovi Acolatse
*Assistant Examiner* — Abdeltif Ajid
(74) *Attorney, Agent, or Firm* — Holland & Hart LLP

(57) ABSTRACT

Methods, systems, and devices for wireless communications are described. In some wireless communications systems, a base station may transmit control information to a user equipment (UE) in search space candidates within a configured search space. To flexibly configure the search space, the base station may determine a reference aggregation level. The base station may add a number of pseudo search space candidates to the reference aggregation level such that the control channel element (CCE) footprint of the reference aggregation level can handle nesting all of the candidates for other aggregation levels. In some cases, the base station may overbook the search space past a CCE limit. The base station may implement an overbooking rule to determine search space candidates to drop from the configuration. The base station may transmit using the search space configuration, and the UE may monitor and decode information according to the configuration.

18 Claims, 18 Drawing Sheets

(56) References Cited

OTHER PUBLICATIONS

International Search Report and Written Opinion—PCT/US2019/018027—ISA/EPO—dated Jul. 10, 2019.
Nokia et al., "On Reducing the PDCCH Channel Estimation and BD Complexity in NR", 3GPP Draft; 3GPP TSG RAN WG1 Ad Hoc 1801, R1-1800550_BD_CCE_REDUCTION_NOK, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018 Jan. 12, 2018, XP051384382, Retrieved from the Internet: URL:http://www.3gpp.org/ftp/tsg%5Fran/WG1%5FRL1/TSGR1%5FAH/NR%5FAH%5F1801/Docs/ [retrieved on Jan. 12, 2018], Section "2.2 Revisiting the NR hashing function", 14 pages, Section 2, par. 1, 4, "Proposal #1 . . . " section 2.1, par. 1, sections 2.1.1, 2.1.2, section 2.1.3, sections 1-5,par. 1 and subsection "38.213 Text Proposal", last two paragraphs.
Qualcomm Incorporated: "Remaining Issues on Control Resource Set and Search Space", 3GPP Draft; R1-1800868_Control Resource Set and Search Space, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018 Jan. 13, 2018 (Jan. 13, 2018), XP051385138, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018] Section "6.2 Correction on hashing", 7 pages.
Interdigital Inc: "On Remaining Issues of Search Spaces and Blind Detection," 3GPP Draft; R1-1800631 on Remaining Issues of Search Spaces and Blind Detection, 3rd Generation Partnership Project (3GPP), Mobile Competence Centre; 650, Route Des Lucioles; F-06921 Sophia-Antipoli, vol. RAN WG1, No. Vancouver, Canada; Jan. 22, 2018-Jan. 26, 2018, Jan. 13, 2018, XP051384961, 6 pages, Retrieved from the Internet: URL: https://www.3gpp.org/ftp/tsg_ran/WG1_RL1/TSGR1_AH/NR_AH_1801/Docs/ [retrieved on Jan. 13, 2018] sections 2, 2.1.
Partial International Search Report—PCT/US2019/018027—ISA/EPO—dated May 15, 2019.

\* cited by examiner

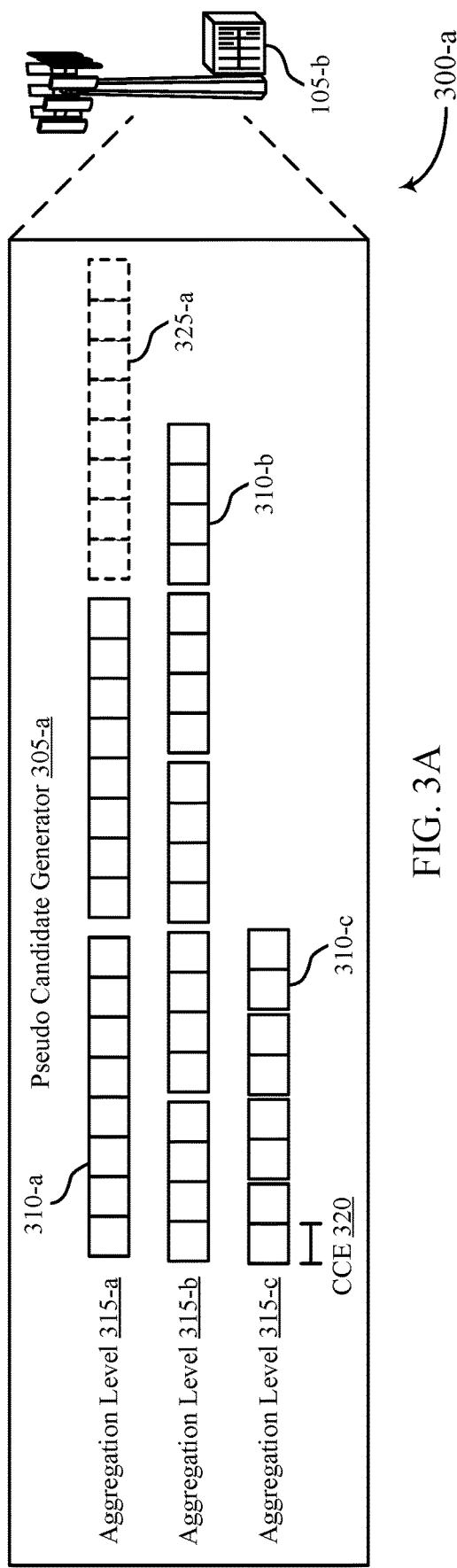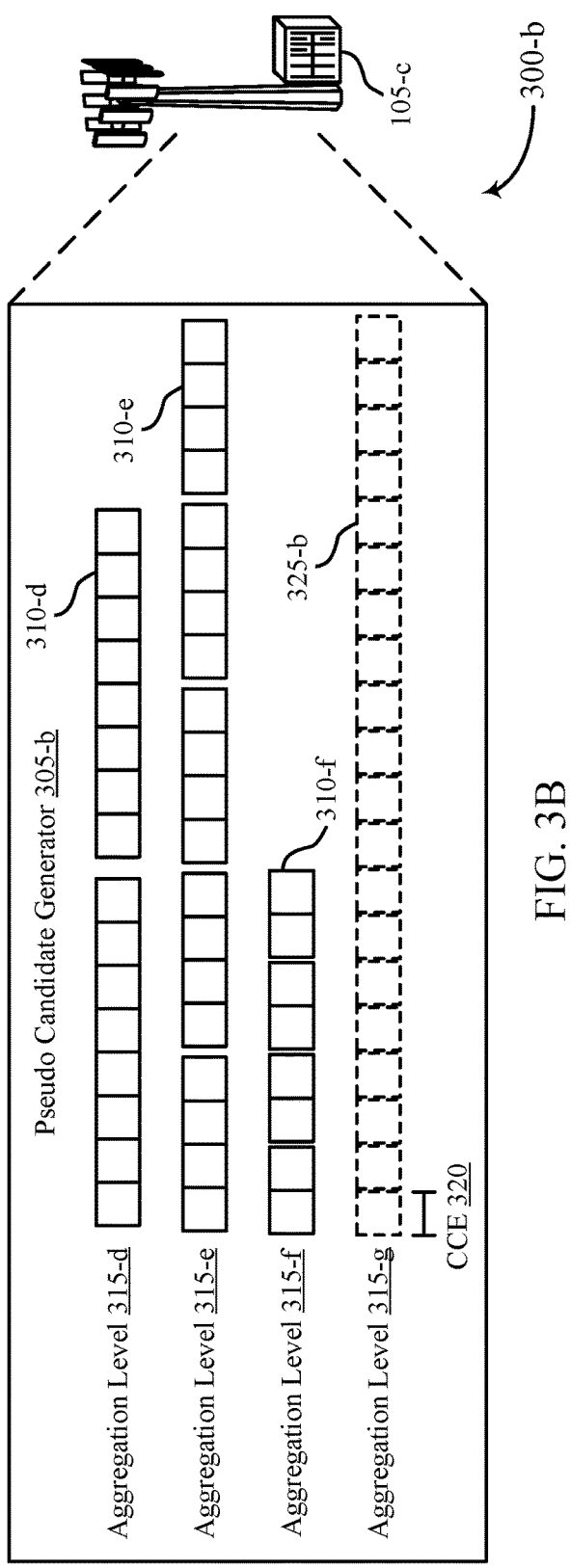
FIG. 3A
FIG. 3B

FLEXIBLE SEARCH SPACE CONFIGURATION AND OVERBOOKING HANDLING

CROSS REFERENCES

The present application for patent claims the benefit of U.S. Provisional Patent Application No. 62/631,438 by Lee et al., entitled "FLEXIBLE SEARCH SPACE CONFIGURATION AND OVERBOOKING HANDLING," filed Feb. 15, 2018, assigned to the assignee hereof, and expressly incorporated by reference in its entirety herein.

BACKGROUND

The following relates generally to wireless communications, and more specifically to flexible search space configuration and overbooking handling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, base stations may configure control channel searching for UEs. The configurations may contain one or more control resource sets (CORESETs) containing multiple control channel elements (CCEs). Base stations may transmit control information to UEs in aggregation level-specific search space candidates on different aggregation levels within the CORESETs. UEs may attempt to decode search space candidates using blind decoding techniques. However, base stations and UEs may be subject to limits on the number of CCEs that may contain control information within a bandwidth part or on a number of blind decoding attempts that a UE may support for a particular duration. Such limitations may cause inefficiencies associated with scheduling and monitoring for downlink control information within search spaces.

SUMMARY

The described techniques relate to improved methods, systems, devices, or apparatuses that support flexible search space configuration and overbooking handling. Generally, the described techniques provide for a wireless communications system in which a base station may flexibly configure a user equipment (UE) for reception of control information. The configuration may include one or more control resource sets (CORESETs) containing multiple control channel elements (CCEs). The base station may transmit control information in search space candidates on different aggregation levels within the CORESETs. In some cases, groupings of these search space candidates may be referred to as search spaces. A search space may correspond to a specific aggregation level or may span multiple aggregation levels. In order to configure one or more search spaces, the base station may determine a reference aggregation level for nesting the other aggregation levels. The base station may determine if any aggregation levels contain more CCEs than the reference aggregation level, and may add a number of pseudo search space candidates to the reference aggregation level until the reference aggregation contains at least as many CCEs as every other aggregation level. The base station may then map the search space candidates and pseudo search space candidates of the reference aggregation level to CCEs in the CORESET, and may nest the search space candidates for the other aggregation levels within the same CCEs. This may efficiently limit the number of CCEs to monitor at the UE based on the configuration.

In some cases, the base station may overbook one or more search spaces past a CCE limit. The base station may implement an overbooking rule to determine CCEs to drop from the configuration. In some cases, the base station may drop search space candidates from within one or more CORESETs to meet the CCE limit. Additionally or alternatively, the base station may drop search space candidates based on a blind decoding attempt limit. The base station may transmit control information using the configuration (e.g., based on pseudo search space candidates, dropped search space candidates, or both), and the UE may monitor and decode control information according to the configuration.

A method of wireless communications is described. The method may include identifying multiple sets of search space candidates for a search space, where each set of search space candidates corresponds to a different aggregation level of a set of aggregation levels, and where the set of aggregation levels includes a reference aggregation level and one or more additional aggregation levels, and calculating a total number of CCEs for each set of search space candidates. The method may further include determining that a greatest total number of CCEs for a set of search space candidates corresponding to an additional aggregation level is greater than a total number of CCEs for a set of search space candidates corresponding to the reference aggregation level, adding one or more pseudo search space candidates to the set of search space candidates corresponding to the reference aggregation level until the total number of CCEs for the set of search space candidates corresponding to the reference aggregation level is greater than or equal to the greatest total number of CCEs for the set of search space candidates corresponding to the additional aggregation level, and transmitting control information within the search space.

An apparatus for wireless communications is described. The apparatus may include means for identifying multiple sets of search space candidates for a search space, where each set of search space candidates corresponds to a different aggregation level of a set of aggregation levels, and where the set of aggregation levels includes a reference aggregation level and one or more additional aggregation levels, and means for calculating a total number of CCEs for each set of search space candidates. The apparatus may further include means for determining that a greatest total number of CCEs for a set of search space candidates corresponding to an additional aggregation level is greater than a total number of CCEs for a set of search space candidates corresponding to the reference aggregation level, means for adding one or more pseudo search space candidates to the set of search space candidates corresponding to the reference aggregation level until the total number of CCEs for the set of search space candidates corresponding to the reference aggregation level is greater than or equal to the greatest total number of CCEs for the set of search space candidates corresponding to the additional aggregation level, and means for transmitting control information within the search space.

Another apparatus for wireless communications is described. The apparatus may include a processor, memory in electronic communication with the processor, and instructions stored in the memory. The instructions may be operable to cause the processor to identify multiple sets of search space candidates for a search space, where each set of search space candidates corresponds to a different aggregation level of a set of aggregation levels, and where the set of aggregation levels comprises a reference aggregation level and one or more additional aggregation levels, and calculate a total number of CCEs for each set of search space candidates. The instructions may be further operable to cause the processor to determine that a greatest total number of CCEs for a set of search space candidates corresponding to an additional aggregation level is greater than a total number of CCEs for a set of search space candidates corresponding to the reference aggregation level, add one or more pseudo search space candidates to the set of search space candidates corresponding to the reference aggregation level until the total number of CCEs for the set of search space candidates corresponding to the reference aggregation level is greater than or equal to the greatest total number of CCEs for the set of search space candidates corresponding to the additional aggregation level, and transmit control information within the search space.

A non-transitory computer-readable medium for wireless communications is described. The non-transitory computer-readable medium may include instructions operable to cause a processor to identify multiple sets of search space candidates for a search space, where each set of search space candidates corresponds to a different aggregation level of a set of aggregation levels, and where the set of aggregation levels includes a reference aggregation level and one or more additional aggregation levels, and calculate a total number of CCEs for each set of search space candidates. The instructions may be further operable to cause the processor to determine that a greatest total number of CCEs for a set of search space candidates corresponding to an additional aggregation level is greater than a total number of CCEs for a set of search space candidates corresponding to the reference aggregation level, add one or more pseudo search space candidates to the set of search space candidates corresponding to the reference aggregation level until the total number of CCEs for the set of search space candidates corresponding to the reference aggregation level is greater than or equal to the greatest total number of CCEs for the set of search space candidates corresponding to the additional aggregation level, and transmit control information within the search space.

Some examples of the method, apparatus, and non-transitory computer-readable medium described herein may further include processes, features, means, or instructions for mapping the one or more pseudo search space candidates and the set of search space candidates corresponding to the reference aggregation level to a set of CCEs. Some examples of the method, apparatus, and non-transitory computer-readable medium described herein may further include processes, features, means, or instructions for nesting, within the set of CCEs, each set of search space candidates corresponding to the one or more additional aggregation levels.

Some examples of the method, apparatus, and non-transitory computer-readable medium described herein may further include processes, features, means, or instructions for mapping the each set of search space candidates corresponding to the one or more additional aggregation levels to CCEs within the set of CCEs according to a hashing function. In some examples of the method, apparatus, and non-transitory computer-readable medium described herein, the nesting may be based at least in part on a CCE limit for a transmission time interval (TTI).

Some examples of the method, apparatus, and non-transitory computer-readable medium described herein may further include processes, features, means, or instructions for mapping the one or more pseudo search space candidates and the set of search space candidates corresponding to the reference aggregation level to a set of CCEs according to a hashing function.

In some examples of the method, apparatus, and non-transitory computer-readable medium described herein, the reference aggregation level may be a highest aggregation level of the set of aggregation levels, a lowest aggregation level of the set of aggregation levels, a pre-defined aggregation level, or a combination thereof. In some examples of the method, apparatus, and non-transitory computer-readable medium described herein, the search space corresponds to a CORESET.

In some examples of the method, apparatus, and non-transitory computer-readable medium described herein, the search space includes a common search space (CS S), a UE specific search space, or a combination thereof. In some examples of the method, apparatus, and non-transitory computer-readable medium described herein, the multiple sets of search space candidates include multiple sets of CSS candidates and multiple sets of UE specific search space candidates. Some examples of the method, apparatus, and non-transitory computer-readable medium described herein may further include processes, features, means, or instructions for mapping a set of CSS candidates of the multiple sets of CSS candidates corresponding to a CSS reference aggregation level to a first set of CCEs. Some examples of the method, apparatus, and non-transitory computer-readable medium described herein may further include processes, features, means, or instructions for nesting, within the first set of CCEs, each other set of CSS candidates of the multiple sets of CSS candidates.

Some examples of the method, apparatus, and non-transitory computer-readable medium described herein may further include processes, features, means, or instructions for mapping a set of UE specific search space candidates of the multiple sets of UE specific search space candidates corresponding to a UE specific search space reference aggregation level to a second set of CCEs. Some examples of the method, apparatus, and non-transitory computer-readable medium described herein may further include processes, features, means, or instructions for nesting, within the second set of CCEs, each other set of UE specific search space candidates of the multiple sets of UE specific search space candidates. In some examples of the method, apparatus, and non-transitory computer-readable medium described herein, the first set of CCEs and the second set of CCEs overlap. In some examples of the method, apparatus, and non-transitory computer-readable medium described herein, the first set of CCEs and the second set of CCEs are mutually exclusive.

Some examples of the method, apparatus, and non-transitory computer-readable medium described herein may further include processes, features, means, or instructions for mapping a set of UE specific search space candidates of the multiple sets of UE specific search space candidates corresponding to a UE specific search space reference aggregation level to a second set of CCEs. Some examples of the method, apparatus, and non-transitory computer-readable medium described herein may further include processes, features, means, or instructions for nesting, within the first set of CCEs and the second set of CCEs, each other set of UE specific search space candidates of the multiple sets of UE specific search space candidates.

In some examples of the method, apparatus, and non-transitory computer-readable medium described herein, the multiple sets of search space candidates include physical downlink control channel (PDCCH) candidates. In some examples of the method, apparatus, and non-transitory computer-readable medium described herein, CCEs corresponding to the one or more pseudo search space candidates may be configured to be free from control information at the reference aggregation level.

In some examples of the method, apparatus, and non-transitory computer-readable medium described herein, a total number of CCEs corresponding to a TTI for the search space exceeds a CCE limit for the TTI. In some examples of the method, apparatus, and non-transitory computer-readable medium described herein, a total number of blind decoding attempts corresponding to a TTI for the search space exceeds a blind decoding attempt limit for the TTI.

A method of wireless communications is described. The method may include configuring a UE with one or more CORESETs in a bandwidth part, the one or more CORESETs including one or more search space candidates, and determining that a total number of CCEs configured for the one or more search space candidates within a TTI is greater than a CCE limit for the TTI. The method may further include identifying a CORESET of the one or more CORESETs based on an overbooking handling rule, dropping one or more search space candidates from the identified CORESET until a total number of remaining CCEs of the one or more CORESETs within the TTI is less than or equal to the CCE limit for the TTI, and transmitting control information within one or more remaining search space candidates including the remaining CCEs of the one or more CORESETs.

An apparatus for wireless communications is described. The apparatus may include means for configuring a UE with one or more CORESETs in a bandwidth part, the one or more CORESETs including one or more search space candidates, and means for determining that a total number of CCEs configured for the one or more search space candidates within a TTI is greater than a CCE limit for the TTI. The apparatus may further include means for identifying a CORESET of the one or more CORESETs based on an overbooking handling rule, means for dropping one or more search space candidates from the identified CORESET until a total number of remaining CCEs of the one or more CORESETs within the TTI is less than or equal to the CCE limit for the TTI, and means for transmitting control information within one or more remaining search space candidates including the remaining CCEs of the one or more CORESETs.

Another apparatus for wireless communications is described. The apparatus may include a processor, memory in electronic communication with the processor, and instructions stored in the memory. The instructions may be operable to cause the processor to configure a UE with one or more CORESETs in a bandwidth part, the one or more CORESETs including one or more search space candidates, and determine that a total number of CCEs configured for the one or more search space candidates within a TTI is greater than a CCE limit for the TTI. The instructions may be further operable to cause the processor to identify a CORESET of the one or more CORESETs based on an overbooking handling rule, drop one or more search space candidates from the identified CORESET until a total number of remaining CCEs of the one or more CORESETs within the TTI is less than or equal to the CCE limit for the TTI, and transmit control information within one or more remaining search space candidates including the remaining CCEs of the one or more CORESETs.

A non-transitory computer-readable medium for wireless communications is described. The non-transitory computer-readable medium may include instructions operable to cause a processor to configure a UE with one or more CORESETs in a bandwidth part, the one or more CORESETs including one or more search space candidates, and determine that a total number of CCEs configured for the one or more search space candidates within a TTI is greater than a CCE limit for the TTI. The instructions may be further operable to cause the processor to identify a CORESET of the one or more CORESETs based on an overbooking handling rule, drop one or more search space candidates from the identified CORESET until a total number of remaining CCEs of the one or more CORESETs within the TTI is less than or equal to the CCE limit for the TTI, and transmit control information within one or more remaining search space candidates including the remaining CCEs of the one or more CORESETs.

In some examples of the method, apparatus, and non-transitory computer-readable medium described herein, the identified CORESET includes a CSS, a UE specific search space, or a combination thereof, and the one or more search space candidates correspond to the CSS, the UE specific search space, or a combination thereof.

In some examples of the method, apparatus, and non-transitory computer-readable medium described herein, at least one CORESET of the one or more CORESETs includes a number of search space candidates that overlap in CCEs for different aggregation levels.

In some examples of the method, apparatus, and non-transitory computer-readable medium described herein, dropping the one or more search space candidates from the identified CORESET includes determining a search space candidate of the identified CORESET to drop, and dropping the determined search space candidate and any additional search space candidates that include CCEs overlapping with CCEs corresponding to the determined search space candidate.

Some examples of the method, apparatus, and non-transitory computer-readable medium described herein may further include processes, features, means, or instructions for identifying an additional CORESET of the one or more CORESETs based on the overbooking handling rule. Some examples of the method, apparatus, and non-transitory computer-readable medium described herein may further include processes, features, means, or instructions for dropping one or more additional search space candidates from the identified additional CORESET until the total number of remaining CCEs of the one or more search space candidates within the TTI may be less than or equal to the CCE limit for the TTI.

In some examples of the method, apparatus, and non-transitory computer-readable medium described herein, identifying the additional CORESET may be further based on dropping every search space candidate of the identified CORESET and determining that dropping the every search space candidate of the identified CORESET results in the total number of remaining CCEs of the one or more CORESETs within the TTI being greater than the CCE limit for the TTI. In other examples of the method, apparatus, and non-transitory computer-readable medium described herein, identifying the additional CORESET may be further based on dropping a first search space candidate of the identified CORESET and determining that dropping the first search space candidate of the identified CORESET results in the total number of remaining CCEs of the one or more CORESETs within the TTI being greater than the CCE limit for the TTI.

Some examples of the method, apparatus, and non-transitory computer-readable medium described herein may further include processes, features, means, or instructions for determining the one or more search space candidates to drop based on candidate indices for the search space candidates, control information formats associated with the search space candidates, radio network temporary identifiers (RNTIs), or a combination thereof.

Some examples of the method, apparatus, and non-transitory computer-readable medium described herein may further include processes, features, means, or instructions for mapping sets of search space candidates corresponding to different aggregation levels within the remaining CCEs of the one or more CORESETs according to a hashing function. Other examples of the method, apparatus, and non-transitory computer-readable medium described herein may further include processes, features, means, or instructions for mapping sets of search space candidates corresponding to different aggregation levels within the one or more CORESETs according to a hashing function and prior to dropping the one or more search space candidates.

In some examples of the method, apparatus, and non-transitory computer-readable medium described herein, dropping the one or more search space candidates from the identified CORESET includes dropping a subset of CCEs of the identified CORESET or dropping the identified CORESET.

In some examples of the method, apparatus, and non-transitory computer-readable medium described herein, identifying the CORESET based on the overbooking handling rule includes identifying the CORESET according to a priority value of the CORESET. Some examples of the method, apparatus, and non-transitory computer-readable medium described herein may further include processes, features, means, or instructions for transmitting an indication of priority values for the one or more CORESETs.

In some examples of the method, apparatus, and non-transitory computer-readable medium described herein, identifying the CORESET based on the overbooking handling rule includes identifying the CORESET according to a CORESET identifier.

In some examples of the method, apparatus, and non-transitory computer-readable medium described herein, identifying the CORESET based on the overbooking handling rule includes determining at least one CORESET of the one or more CORESETs that does not include a CSS, and identifying the CORESET from the determined at least one CORESET.

Some examples of the method, apparatus, and non-transitory computer-readable medium described herein may further include processes, features, means, or instructions for determining that a total number of blind decoding attempts for decoding the remaining search space candidates within the TTI is greater than a blind decoding attempt limit for the TTI. Some examples of the method, apparatus, and non-transitory computer-readable medium described herein may further include processes, features, means, or instructions for identifying one or more additional search space candidates of the one or more CORESETs to drop based on a blind decoding overbooking rule. Some examples of the method, apparatus, and non-transitory computer-readable medium described herein may further include processes, features, means, or instructions for dropping the identified one or more additional search space candidates until the total number of blind decoding attempts for decoding the remaining search space candidates within the TTI is less than or equal to the blind decoding attempt limit for the TTI.

In some examples of the method, apparatus, and non-transitory computer-readable medium described herein, identifying the one or more search space candidates based on the blind decoding overbooking rule includes identifying each search space candidate according to a CORESET identifier, an index of the search space candidate, an aggregation level of the search space candidate, a control information format associated with the search space candidate, an RNTI, or a combination thereof.

Some examples of the method, apparatus, and non-transitory computer-readable medium described herein may further include processes, features, means, or instructions for calculating a number of CCEs of each CORESET of the one or more CORESETs based on a reference aggregation level for each CORESET and a number of search space candidates corresponding to the reference aggregation level, a number of pseudo search space candidates corresponding to the reference aggregation level, or a combination thereof.

In some examples of the method, apparatus, and non-transitory computer-readable medium described herein, the TTI includes a slot.

A method of wireless communications is described. The method may include receiving a configuration for a search space, monitoring, according to the configuration, for multiple sets of search space candidates within the search space, where each set of search space candidates corresponds to a different aggregation level of a set of aggregation levels, identifying one or more pseudo search space candidates corresponding to a reference aggregation level of the set of aggregation levels, and decoding search space candidates within the search space except for the identified one or more pseudo search space candidates.

An apparatus for wireless communications is described. The apparatus may include means for receiving a configuration for a search space, means for monitoring, according to the configuration, for multiple sets of search space candidates within the search space, where each set of search space candidates corresponds to a different aggregation level of a set of aggregation levels, means for identifying one or more pseudo search space candidates corresponding to a reference aggregation level of the set of aggregation levels, and means for decoding search space candidates within the search space except for the identified one or more pseudo search space candidates.

Another apparatus for wireless communications is described. The apparatus may include a processor, memory in electronic communication with the processor, and instructions stored in the memory. The instructions may be operable to cause the processor to receive a configuration for a search space, monitor, according to the configuration, for multiple sets of search space candidates within the search space, where each set of search space candidates corresponds to a different aggregation level of a set of aggregation levels, identify one or more pseudo search space candidates corresponding to a reference aggregation level of the set of aggregation levels, and decode search space candidates within the search space except for the identified one or more pseudo search space candidates.

A non-transitory computer-readable medium for wireless communications is described. The non-transitory computer-readable medium may include instructions operable to cause a processor to receive a configuration for a search space, monitor, according to the configuration, for multiple sets of search space candidates within the search space, where each set of search space candidates corresponds to a different aggregation level of a set of aggregation levels, identify one or more pseudo search space candidates corresponding to a reference aggregation level of the set of aggregation levels, and decode search space candidates within the search space except for the identified one or more pseudo search space candidates.

In some examples of the method, apparatus, and non-transitory computer-readable medium described herein, multiple sets of search space candidates may be nested within CCEs corresponding to the reference aggregation level. In some examples of the method, apparatus, and non-transitory computer-readable medium described herein, the one or more pseudo search space candidates and a set of search space candidates corresponding to the reference aggregation level may be mapped to the CCEs corresponding to the reference aggregation level.

In some examples of the method, apparatus, and non-transitory computer-readable medium described herein, decoding the search space candidates comprises decoding each search space candidate using a UE specific RNTI, performing a parity check on the decoded each search space candidate, and determining control information based on the decoding if the parity check passes. In some examples of the method, apparatus, and non-transitory computer-readable medium described herein, the parity check includes a cyclic redundancy check (CRC).

In some examples of the method, apparatus, and non-transitory computer-readable medium described herein, the reference aggregation level may be a highest aggregation level of the set of aggregation levels, a lowest aggregation level of the set of aggregation levels, a pre-defined aggregation level, or a combination thereof.

In some examples of the method, apparatus, and non-transitory computer-readable medium described herein, the search space corresponds to a CORESET. In some examples of the method, apparatus, and non-transitory computer-readable medium described herein, the search space includes a CSS, a UE specific search space, or a combination thereof. In some examples of the method, apparatus, and non-transitory computer-readable medium described herein, multiple sets of search space candidates include PDCCH candidates.

A method of wireless communications is described. The method may include receiving a configuration for one or more CORESETs in a bandwidth part, where the one or more CORESETs include one or more search space candidates, identifying one or more dropped search space candidates of the one or more search space candidates based on the configuration, where a total number of remaining CCEs of the one or more CORESETs within a TTI is less than or equal to a CCE limit for the TTI, monitoring, according to the configuration, for one or more remaining search space candidates of the one or more search space candidates within the TTI based on the one or more dropped search space candidates, and decoding the one or more remaining search space candidates.

An apparatus for wireless communications is described. The apparatus may include means for receiving a configuration for one or more CORESETs in a bandwidth part, where the one or more CORESETs include one or more search space candidates, means for identifying one or more dropped search space candidates of the one or more search space candidates based on the configuration, where a total number of remaining CCEs of the one or more CORESETs within the TTI is less than or equal to a CCE limit for the TTI, means for monitoring, according to the configuration, for one or more remaining search space candidates of the one or more search space candidates within the TTI based on the one or more dropped search space candidates, and means for decoding the one or more remaining search space candidates.

Another apparatus for wireless communications is described. The apparatus may include a processor, memory in electronic communication with the processor, and instructions stored in the memory. The instructions may be operable to cause the processor to receive a configuration for one or more CORESETs in a bandwidth part, where the one or more CORESETs include one or more search space candidates, identify one or more dropped search space candidates of the one or more search space candidates based on the configuration, where a total number of remaining CCEs of the one or more CORESETs within the TTI is less than or equal to a CCE limit for the TTI, monitor, according to the configuration, for one or more remaining search space candidates of the one or more search space candidates within the TTI based on the one or more dropped search space candidates, and decode the one or more remaining search space candidates.

A non-transitory computer-readable medium for wireless communications is described. The non-transitory computer-readable medium may include instructions operable to cause a processor to receive a configuration for one or more CORESETs in a bandwidth part, where the one or more CORESETs include one or more search space candidates, identify one or more dropped search space candidates of the one or more search space candidates based on the configuration, where a total number of remaining CCEs of the one or more CORESETs within the TTI is less than or equal to a CCE limit for the TTI, monitor, according to the configuration, for one or more remaining search space candidates of the one or more search space candidates within the TTI based on the one or more dropped search space candidates, and decode the one or more remaining search space candidates.

In some examples of the method, apparatus, and non-transitory computer-readable medium described herein, the each CORESET of the one or more CORESETs includes a CSS, a UE specific search space, or a combination thereof, and the one or more dropped search space candidates correspond to the CSS, the UE specific search space, or a combination thereof.

In some examples of the method, apparatus, and non-transitory computer-readable medium described herein, the identified one or more dropped search space candidates include a subset of CCEs of a CORESET of the one or more CORESETs. In other examples of the method, apparatus, and non-transitory computer-readable medium described herein, the identified one or more dropped search space candidates include a CORESET of the one or more CORE- SETs. In some examples of the method, apparatus, and non-transitory computer-readable medium described herein, the identified one or more dropped search space candidates include CCEs of multiple CORESETs of the one or more CORESETs.

In some examples of the method, apparatus, and non-transitory computer-readable medium described herein, identifying the one or more dropped search space candidates may be further based on an overbooking handling rule.

In some examples of the method, apparatus, and non-transitory computer-readable medium described herein, the configuration includes an indication of priority values for the one or more CORESETs. In some examples of the method, apparatus, and non-transitory computer-readable medium described herein, the one or more dropped search space candidates may be identified based on the priority values for the one or more CORESETs.

In some examples of the method, apparatus, and non-transitory computer-readable medium described herein, the one or more dropped search space candidates may be identified based on CORESET identifiers for the one or more CORESETs.

In some examples of the method, apparatus, and non-transitory computer-readable medium described herein, identifying the one or more dropped search space candidates includes identifying a dropped search space candidate based on a CORESET identifier, an index of the dropped search space candidate, an aggregation level of the dropped search space candidate, a control information format associated with the dropped search space candidate, an RNTI, or a combination thereof.

In some examples of the method, apparatus, and non-transitory computer-readable medium described herein, decoding the one or more remaining search space candidates includes performing blind decoding attempts for the one or more remaining search space candidates. In some examples of the method, apparatus, and non-transitory computer-readable medium described herein, a total number of blind decoding attempts for decoding the one or more remaining search space candidates within the TTI is less than or equal to a blind decoding attempt limit for the TTI.

In some examples of the method, apparatus, and non-transitory computer-readable medium described herein, the TTI includes a slot.

BRIEF DESCRIPTION OF THE DRAWINGS

FIGS. 3A and 3B illustrate examples of pseudo search space candidate generation processes that support flexible search space configuration and overbooking handling in accordance with aspects of the present disclosure.

DETAILED DESCRIPTION

Figure 1:
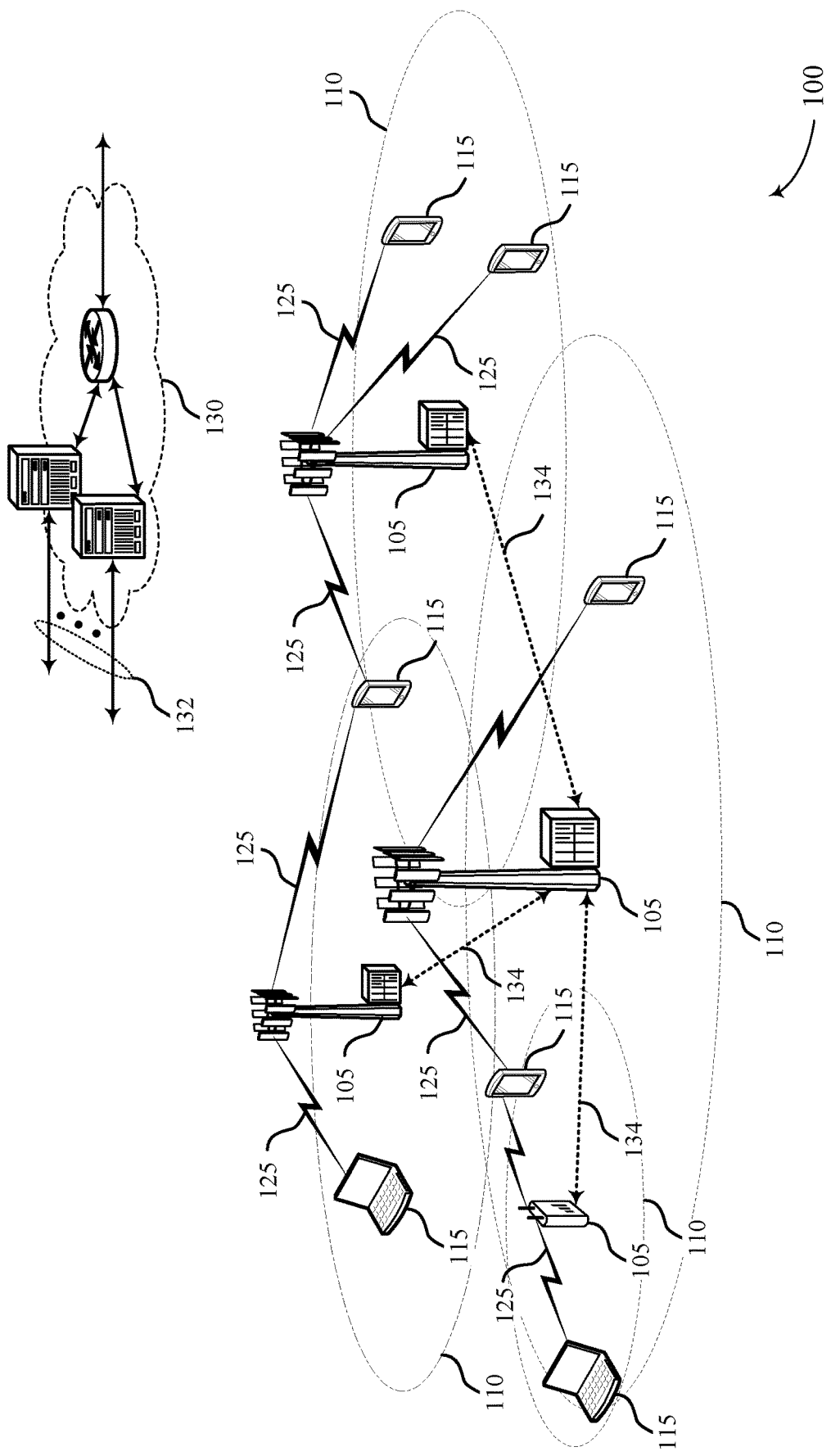
FIGS. 1 and 2 illustrate examples of wireless communications systems that support flexible search space configuration and overbooking handling in accordance with aspects of the present disclosure.

In some wireless communications systems, base stations may perform flexible search space configuration and overbooking handling. A base station may transmit control information to a user equipment (UE) within one or more configured search spaces. The base station may configure one or more control resource sets (CORESETs) containing multiple control channel elements (CCEs). The base station may transmit the control information in search space candidates on different aggregation levels within the CORESETs, where the search space candidates may be grouped into one or more search spaces. In some cases, the base station may additionally transmit an indication of the search space configuration to the UE. The UE may monitor a channel (e.g., a physical downlink control channel (PDCCH)) for downlink control information (DCI) from the base station according to the search space configuration. The UE may detect and decode the control information within the search space candidates for the configured search space(s).

In some cases, UEs or base stations may be subject to limits on a number of CCEs that may be used for control information transmission in a CORESET, a bandwidth part, or a transmission time interval (TTI), such as a slot. To efficiently use the CCEs within a CORESET while minimizing coexistence interference between search spaces, a base station may construct a nested search space. In order to configure the nested search space, the base station may identify a reference aggregation level for nesting other aggregation levels. The base station may calculate a total number of CCEs for each aggregation level (e.g., based on the aggregation level and the number of search space candidates for that aggregation level) and may determine whether any aggregation level contains more utilized CCEs than the reference aggregation level. If so, the base station may add a number of pseudo search space candidates to the reference aggregation level until the reference aggregation contains at least as many CCEs as every other aggregation level. The base station may then map the search space candidates and pseudo search space candidates of the reference aggregation level to CCEs in the search space and may nest the search space candidates for the other aggregation levels within these same CCEs (e.g., according to a hashing function). Nesting the search space candidates may efficiently utilize the CCEs of the search space, while implementing pseudo search space candidates in the reference aggregation level may separate candidates for different search spaces, reducing the probability of coexistence interference.

In some cases, the base station may overbook a search space configuration or bandwidth part past a CCE limit. In response, the base station may implement an overbooking rule to determine CCEs to drop from the configuration. In some cases, the base station may drop entire CORESETs to meet the CCE limit. In other cases, the base station may drop search space candidates or entire search spaces from within one or more CORESETs to meet the CCE limit. The base station may determine the search space candidates to drop based on CORESET priority values, CORESET identifiers, candidate indexes, candidate aggregation levels, associated DCI formats, radio network temporary identifiers (RNTIs), or some combination of these parameters. Additionally or alternatively, the base station may drop CCEs or search space candidates based on a blind decoding attempts limit. Performing a candidate dropping procedure may allow the base station to support and maintain the search space CCE or candidate limits. The base station may transmit control information using the configured search space(s) (e.g., based on the pseudo search space candidates, the dropped search space candidates, or both), and the UE may monitor and decode control information according to the configuration.

Aspects of the disclosure are initially described in the context of wireless communications systems. Additional aspects of the disclosure are described with respect to pseudo search space candidate generation procedures, overbooking handling procedures, and process flows. Aspects of the disclosure are further illustrated by and described with reference to apparatus diagrams, system diagrams, and flowcharts that relate to flexible search space configuration and overbooking handling.

FIG. 1 illustrates an example of a wireless communications system 100 that supports flexible search space configuration and overbooking handling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrials radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation (CA) configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space (CSS) and one or more UE specific control regions or UE specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. A CA configuration may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In wireless communications system 100, base station 105 may perform flexible search space configuration, overbooking handling, or both. A base station 105 may transmit control information to a UE 115 within a configured search space. The search space may part of a CORESET containing multiple CCEs. The base station 105 may transmit the control information in search space candidates on different aggregation levels within the CORESET. In some cases, the base station 105 may additionally transmit an indication of the search space configuration to the UE 115. The UE 115 may monitor a channel (e.g., a PDCCH) for DCI from the base station 105 according to the search space configuration. The UE 115 may detect and decode the control information within the search space candidates.

In some cases, UEs 115 or base stations 105 may include limits on a number of CCEs that may be used for control information transmission in a frequency region (e.g., a bandwidth part, a CORESET, etc.) or in a time region (e.g., a TTI, a slot, etc.). To efficiently use the CCEs within a search space while minimizing coexistence interference between search spaces, a base station 105 may construct a nested search space. In order to configure the nested search space, the base station 105 may identify a reference aggregation level for nesting other aggregation levels. The base station 105 may calculate a total number of utilized CCEs for each aggregation level (e.g., based on the aggregation level and the number of search space candidates utilizing CCEs for that aggregation level), and may determine whether any aggregation level contains more utilized CCEs than the reference aggregation level. If so, the base station 105 may add a number of pseudo search space candidates to the reference aggregation level until the reference aggregation level contains at least as many CCEs as the aggregation level with the most utilized CCEs. The base station 105 may then map the search space and pseudo search space candidates of the reference aggregation level to CCEs in the search space, and may nest the search space candidates for the other aggregation levels within these same CCEs (e.g., according to a hashing function). Nesting the search space candidates may efficiently utilize the CCEs of the search space, while implementing pseudo search space candidates in the reference aggregation level may separate candidates for different search spaces (e.g., search spaces within a same CORESET), reducing the probability of coexistence interference.

In some cases, the base station 105 may overbook a search space or set of search spaces past a CCE limit. In response, the base station 105 may implement an overbooking rule to determine CCEs to drop from the configuration. In some cases, the base station 105 may drop entire CORESETs to meet the CCE limit. In other cases, the base station 105 may drop search space candidates from within one or more CORESETs to meet the CCE limit. The base station 105 may determine the CORESETs or candidates to drop based on CORESET priority values, CORESET identifiers, candidate indexes, candidate aggregation levels, associated DCI formats, RNTIs, or some combination of these parameters. Additionally or alternatively, the base station 105 may drop CCEs based on a blind decoding attempts limit. Performing the CCE or search space candidate dropping procedure may allow the base station 105 to support and maintain the search space CCE or candidate limits. The base station 105 may transmit control information using the configured search space(s) (e.g., based on the pseudo search space candidates, the dropped search space candidates, or both), and the UE 115 may monitor and decode control information according to the configuration.

Figure 2:
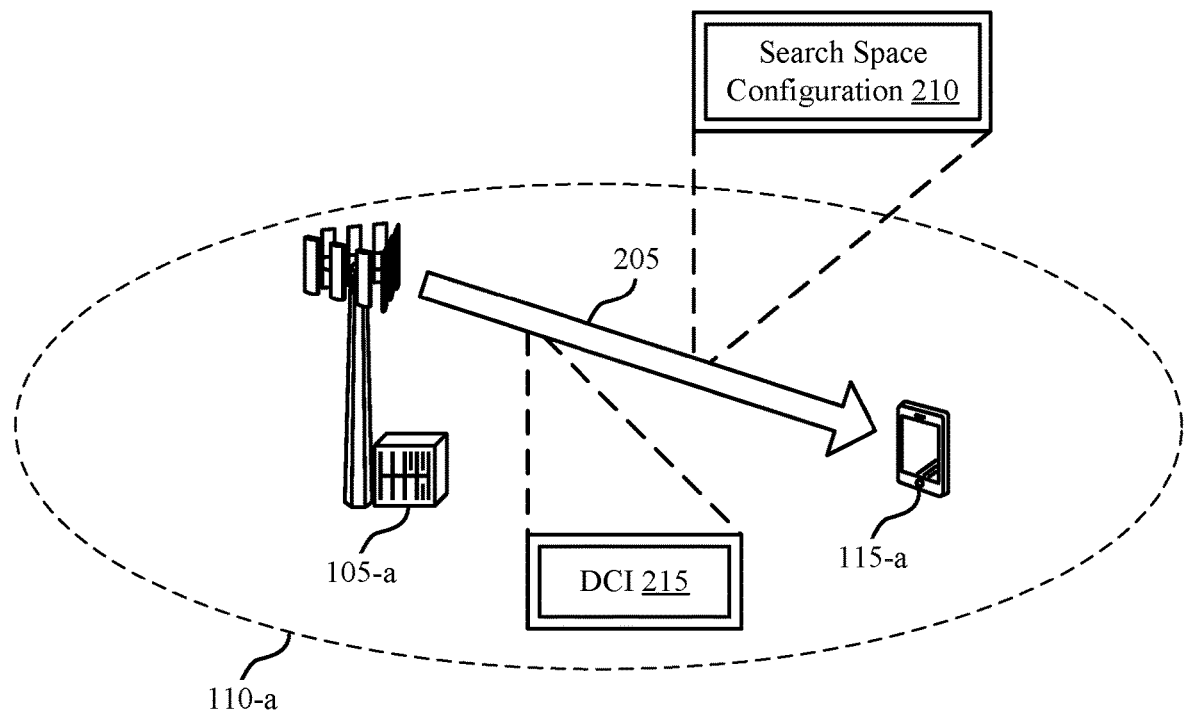

FIG. 2 illustrates an example of a wireless communications system 200 that supports flexible search space configuration and overbooking handling in accordance with aspects of the present disclosure. The wireless communications system 200 may include base station 105-a and UE 115-a, which may be examples of a base station 105 and a UE 115, as described with reference to FIG. 1. Base station 105-a may provide network coverage for geographic area 110-a. Base station 105-a may communicate with UE 115-a on the downlink 205. For example, base station 105-a may transmit a search space configuration 210 (e.g., configuring one or more search spaces) to UE 115-a. Additionally or alternatively, base station 105-a may transmit DCI 215 to UE 115-a on the downlink 205 within a PDCCH (e.g., in a search space indicated by the search space configuration 210).

In some wireless communications systems 200 (e.g., NR systems), base station 105-a may configure a search space for transmission of control information (e.g., DCI 215) to UE 115-a. As discussed herein, a search space may be part of a CORESET (e.g., per bandwidth part), and may be identified based on the identifier of the CORESET. A CORESET may span multiple RBs in the frequency domain, and may span a number of OFDM symbols in the time domain. Additionally or alternatively, a search space may refer to any resources used for control information transmission within a given TTI (e.g., a slot). That is, a CORESET may be configured to indicate a location in frequency and a length of time (e.g., a number of OFDM symbols that the CORESET spans in time), and a search space for the CORESET may be configured to indicate the location in time (e.g., a starting OFDM symbol) and a periodicity in time for control information transmissions. The CORESET may be divided into a number of CCEs and may support a number of different aggregation levels for transmission of control information. Each aggregation level may correspond to the number of CCEs allocated for each DCI 215 candidate. For example, an aggregation level of four may indicate that control information for that aggregation level is transmitted in multiples of four CCEs of a CORESET. This control information contained within a four CCE-length segment may be referred to as a search space candidate, a decoding candidate, or simply a candidate. A search space may include a number of search space candidates on one aggregation level or across multiple aggregation levels.

In some cases, multiple CORESETs may be configured for a TTI (e.g., per bandwidth part). For example, in some cases, base station 105-a may configure up to three CORESETs per bandwidth part within a slot, or more than three CORESETs from a control carrier perspective. Similarly, multiple search spaces may be configured for the CORESET(s) of a TTI (e.g., up to ten per bandwidth part). Base station 105-a may transmit DCI 215 within the search space(s) in search space candidates for different aggregation levels. UE 115-a may monitor the search space(s) for the search space candidates and may detect and decode the DCI 215 transmitted in the search space(s).

The positioning of search space candidates within a search space may be based on a hashing function. This hashing function may be based on randomization parameters, and may determine positioning of search space candidates for DCI 215 transmission within a range of CCEs. For example, the hashing function may determine random or pseudo random positioning for search space candidates within a search space, a CORESET, a TTI, or a subset of CCEs (e.g., where the CCEs may be non-contiguous, but may be stitched together for the purpose of hashing). In some cases, base station 105-a may configure a search space such that search space candidates of different aggregation levels may overlap within CCEs.

In some cases, base station 105-a or UE 115-a may include limits on the number of CCEs to transmit or monitor in within a certain TTI (e.g., a slot), bandwidth part, or both. For example, UE 115-a may include a channel estimation limit for the PDCCH based on a channel estimation or channel monitoring capability of UE 115-a. In one specific example, UE 115-a may support channel estimation for up to 48 CCEs in a given slot per scheduled cell (e.g., a bandwidth part for base station 105-a). Base station 105-a or UE 115-a may include limits for PDCCH transmissions for different numbers of OFDM symbols. For example, base station 105-a, UE 115-a, or both may include limits on PDCCH transmission or monitoring for up to three OFDM symbols at the beginning of a slot, for any span of up to three consecutive OFDM symbols within a slot (e.g., as all search space configurations 210 for a specific UE 115, such as UE 115-a, may be contained within three consecutive symbols in a slot), for any number of symbols less than or equal to fourteen, or some combination of these. The number of CCEs used within a TTI may refer to any CCE of a CORESET within that TTI that includes at least one search space candidate (e.g., for any search space in any CORESET). Accordingly, to follow a limit of 48 CCEs within a slot, base station 105-a may transmit search space candidates on a single aggregation level across 48 CCEs, or may transmit overlapping search space candidates of multiple different aggregation levels, where the total footprint of the combined aggregation levels equals 48 CCEs. In this way, base station 105-a may transmit more control information within a TTI by overlapping search space candidates of different aggregation levels within the same CCEs.

In some cases, base station 105-a, UE 115-a, or both may include limits on the number of blind decoding attempts supported for a certain TTI, bandwidth part, or both, in addition or alternative to the number of CCEs containing search space candidates. The blind decoding limit may depend on the location of the symbols within a slot, the subcarrier spacing (SCS) of search space candidates, or a combination thereof. In one specific example, the blind decoding attempts limits may be described by the table below:

TABLE 1

Limitations to Blind Decoding Attempts

| | SCS | | | |
| --- | --- | --- | --- | --- |
| | 15 kHz | 30 kHz | 60 kHz | 120 kHz |
| Case 1-1 | 44 | 36 | 22 | 20 |
| Case 1-2 | [44] | — | — | — |
| Case 2 | [44 + X] | [36 + Y] | [22 + Y] | [20] |

In Table 1, the values in brackets may in some cases be adjusted but not increased. As shown, Cases 1-1 and 1-2 may refer to a PDCCH monitoring periodicity of 14 or more OFDM symbols, while Case 2 may refer to a PDCCH monitoring periodicity of less than 14 OFDM symbols. Furthermore, Case 1-1 may refer to PDCCH monitoring on up to three OFDM symbols at the beginning of a slot, and Case 1-2 may refer to PDCCH monitoring on any span of up to three consecutive OFDM symbols of a slot. In some cases, $X<16$, $Y<8$. Base station 105-a may limit the number of CCEs or search space candidates to transmit or configure for monitoring based on these blind decoding limits for UE 115-a.

Base station 105-a may support flexible search space configuration based on these CCE and blind decoding limits. For example, base station 105-a may perform search space hashing to position search space candidates in such a way to handle these limits without significantly restricting PDCCH scheduling. In some cases, this flexible search space configuration may result in overbooking the search space configuration 210 with respect to a CCE limit, a blind decoding limit, or both. In these cases, base station 105-a or UE 115-a may implement one or more rules to drop certain PDCCH search space candidates in order to meet the CCE limits, blind decoding limits, or both for a given TTI, bandwidth part, or both. In some cases, the CCE or blind decoding limits may vary from slot to slot.

To efficiently handle a CCE limit, base station 105-a may configure a nested search space. In a nested search space, base station 105-a may identify a reference aggregation level, which may alternatively be referred to as a nesting aggregation level or container aggregation level. This reference aggregation level may contain a number of search space candidates spanning multiple CCEs. The number of CCEs containing search space candidates may be referred to as the footprint of the reference aggregation level. Base station 105-a may position search space candidates for all other aggregation levels (e.g., for the same search space or across search spaces) within the footprint of the reference aggregation level. For example, every search space candidate for another aggregation level overlaps with at least one search space candidate of the reference aggregation level. In this way, if the search space candidates for the reference aggregation level meet the limits for CCEs, the entire search space will meet the limits for CCEs. However, if the reference aggregation level does not meet the limits for CCEs and blind decoding (e.g., if base station 105-a overbooked the search space), base station 105-a may determine a number of CCEs—and corresponding search space candidates—to drop from the configuration. Base station 105-a may send an indication of this search space configuration 210 to UE 115-a, and UE 115-a may determine how to monitor the channel based on this search space configuration 210. Base station 105-a may transmit DCI 215 in one or more of the search space candidates within the configured search space(s), and UE 115-a may receive and decode the DCI 215 based on monitoring according to the search space configuration 210. UE 115-a may determine the UE specific control information for UE 115-a based on an RNTI and a parity check. For example, UE 115-a may attempt to decode the search space candidates using a UE specific RNTI for UE 115-a and may perform a parity check on the decoded bits. If the decoded bits pass the parity check (e.g., a CRC), UE 115-a may determine that the decoded bits correspond to control information for UE 115-a.

FIGS. 3A and 3B illustrate examples of pseudo search space candidate generation processes 300 that support flexible search space configuration and overbooking handling in accordance with aspects of the present disclosure. For example, FIG. 3A illustrates a pseudo search space candidate generation process 300-a implementing a reference aggregation level corresponding to the largest aggregation level 315-a. A base station 105, such as base station 105-b or a base station 105 as described herein with reference to FIGS. 1 and 2, may perform the pseudo search space candidate generation process 300-a when configuring a search space. For example, in some cases, base station 105-b may utilize a pseudo candidate generator 305-a, which may be an example of a hardware component or a software module implemented as part of a PDCCH scheduling or configuration procedure.

As illustrated, the pseudo search space candidate generation process 300-a may include three aggregation levels 315, including aggregation level 315-a, 315-b, and 315-c, which may correspond to aggregation levels of 8, 4, and 2, respectively. Each aggregation level 315 may include a number of search space candidates 310 that span a number of CCEs 320 corresponding to the aggregation level 315. For example, for an aggregation level of 8, search space candidate 310-a spans eight CCEs 320. Similarly, search space candidate 310-b spans four CCEs 320 and search space candidate 310-c spans two CCEs 320. It is to be understood that base station 105-b may configure a search space with any number of aggregation levels 315 or search space candidates 310.

In order to handle a limited CCE budget (e.g., based on the CCE or blind decoding limits discussed herein, for example, with respect to FIG. 2), base station 105-b may nest the search space candidates 310 for different aggregation levels 315 to efficiently utilize the CCEs 320. In some cases, base station 105-b may perform nesting of search space candidates 310 per CORESET (e.g., across multiple search spaces). Alternatively, base station 105-b may perform nesting of search space candidates 310 per search space.

Base station 105-a may determine a CCE budget for the CORESET, search space, or bandwidth part based on the reference aggregation level. As illustrated, base station 105-b (e.g., using pseudo candidate generator 305-a) may determine the CCE budget based on the largest aggregation level configured for the CORESET (i.e., aggregation level 315-a). In some cases, the reference aggregation level may be an example of a largest aggregation level, a smallest aggregation level, or a pre-defined aggregation level. For example, as illustrated, aggregation level 315-a may be the reference aggregation level because it may be the largest aggregation level of the CORESET, or due to a pre-defined reference aggregation level corresponding to aggregation level 8.

In some cases, the reference aggregation level may not have the largest footprint of the set of aggregation levels. For example, as illustrated, aggregation level 315-a may include two search space candidates 310-a (e.g., corresponding to sixteen CCEs 320), while aggregation level 315-b may include five search space candidates 310-b (e.g., corresponding to twenty CCEs 320). In such cases, base station 105-b may not be able to fully nest the search space candidates 310-b for aggregation level 315-b within the CCE footprint of aggregation level 315-a. To handle this, base station 105-b may generate one or more pseudo search space candidates 325-a for the reference aggregation level. These pseudo reference aggregation level candidates may not include any control information at the reference aggregation level, and correspondingly a UE 115 may not decode the pseudo search space candidates 325-a. Instead, the pseudo search space candidates 325-a may support nesting for other aggregation level search space candidates.

Pseudo candidate generator 305-a may determine the number of pseudo search space candidates 325-a to add to the reference aggregation level based on the following equation:

$$N_{pseudo} = \max\left(\max_{x=1,2,\ldots,AL_{max}}\left(\text{ceiling}\left(\frac{N_{AL(x)}}{\frac{AL_{ref}}{x}}\right)\right) - N_{AL(AL_{ref})}, 0\right), \quad (1)$$

where $N_{AL(x)}$ is the configured number of search space candidates for aggregation level x, and $N_{pseudo}$ is the number of pseudo search space candidates 325-a to add to the reference aggregation level. The equation may calculate the number of pseudo search space candidates 325-a to add such that the total number of CCEs 320 for the reference aggregation level is greater than or equal to the greatest total number of CCEs 320 for the other aggregation levels 315. For example, as illustrated, using the above equation or another method, pseudo candidate generator 305-a may determine total numbers of CCEs 320 for each set of search space candidates 310 corresponding to each aggregation level 315. Pseudo candidate generator 305-a may determine that the reference aggregation level—aggregation level 315-a—contains sixteen total CCEs 320, aggregation level 315-b contains twenty total CCEs 320, and aggregation level 315-c contains eight total CCEs 320. Pseudo candidate generator 305-a may determine to add pseudo search space candidates 325-a to aggregation level 315-a until the total number of CCEs 320 corresponding to the search space candidates 310-a and pseudo search space candidates 325-a for the reference aggregation level is greater than the greatest number of total CCEs 320 for the other aggregation levels 315. In this case, adding one pseudo search space candidate 325-a to the reference aggregation level may result in twenty-four total CCEs 320 for the reference aggregation level, which is greater than the greatest total number of CCEs 320 for another aggregation level 315 (i.e., the twenty CCEs 320 of aggregation level 315-*b*). Accordingly, adding pseudo candidate 325-*a* allows base station 105-*b* to nest all of the other aggregation levels 315 within the reference aggregation level.

The search space candidates 310 are illustrated to show the numbers of CCEs 320 for each aggregation level 315, as opposed to showing the actual mapping of search space candidates 310 to CCEs 320. Once the pseudo candidate generator 305-*a* generates the pseudo search space candidates 325-*a* for the reference aggregation level, base station 105-*a* may map the search space candidates 310—and pseudo search space candidates 325—to resources. For example, base station 105-*a* may perform a hashing function (e.g., an enhanced PDCCH (ePDCCH) style hashing function) to determine the positioning of the search space candidates 310-*a* and pseudo search space candidates 325-*a* for the reference aggregation level. These candidates may or may not be contiguous in the frequency domain. Base station 105-*a* may then map the search space candidates 310 for the other aggregation levels 315 to random positions in the footprint of the reference aggregation level. For example, the search space candidates 310-*b* and 310-*c* may be mapped to the same CCEs 320 as the search space candidates 310-*a* and pseudo search space candidates 325-*a*.

In some cases, base station 105-*a* may again implement hashing for this mapping of search space candidates 310. For example, base station 105-*a* may stitch together the CCEs 320 selected for the reference aggregation level candidates (e.g., such that they form a contiguous set of CCEs for the purpose of mapping), and may renumber these CCEs 320 to perform hashing (e.g., using an ePDCCH style hashing function). In some cases, search space candidates 310 may be mapped to CCEs 320 based on the aggregation level 315 of the search space candidates 310. For example, aggregation level 1 candidates may be mapped to any CCE 320, aggregation level 2 candidates may be limited to start in every other CCE 320, aggregation level 4 candidates may be limited to start in every fourth CCE 320, etc. In this way, lower aggregation level candidates may not span across CCEs 320 for multiple higher level candidates. Accordingly, in a CORESET spanning 40 CCEs 320, base station 105-*a* may randomly map an aggregation level 8 search space candidate 310-*a* for a search space to one of five potential candidate positions. Once base station 105-*a* has mapped the three candidates for the reference aggregation level (e.g., the two search space candidates 310-*a* and the one pseudo search space candidate 325-*a*) to CCE resources, base station 105-*a* may map the search space candidates 310-*b* for aggregation level 315-*b* to the six potential candidate positions within the footprint of the reference aggregation level, and may map the search space candidates 310-*c* for aggregation level 315-*c* to the twelve potential candidate positions within the footprint for aggregation level 2 candidates. In this way, base station 105-*a* may nest aggregation levels 315-*b* and 315-*c* within the reference aggregation level.

FIG. 3B illustrates a pseudo search space candidate generation process 300-*b* implementing a reference aggregation level corresponding to the smallest aggregation level 315-*g*. When a base station 105, such as base station 105-*c* or a base station 105 as described herein with reference to FIGS. 1 through 3A, configures a search space profile for a UE 115, the search space candidates 310 for each aggregation level 315 may not be contained within the CCEs 320 for the reference aggregation level. Pseudo candidate generator 305-*b*, or another device or module implementing a similar procedure, may introduce pseudo search space candidates 325 for the reference aggregation level that do not need to be decoded by a UE 115. These pseudo search space candidates 325 may improve the efficiency of candidate hashing, and may improve the coexistence between different UE 115 specific search spaces. For example, by adding pseudo search space candidates 325, base station 105-*c* may nest every search space candidate 310 within the footprint of the reference aggregation level for a search space. By mapping the search space candidates 310 and pseudo search space candidates 325 for the reference aggregation level to CCEs 320 non-overlapping with CCEs 320 used for other UE search spaces, base station 105 may improve the coexistence of the different search spaces.

As illustrated, pseudo search space candidate generation process 300-*b* may utilize a pre-defined reference aggregation level of level 1. For example, even though base station 105-*c* does not include any search space candidates 310 for aggregation level 1, base station 105-*c* may still utilize this aggregation level 315-*g* for nesting. Pseudo candidate generator 305-*b* may determine the largest footprint for the aggregation levels 315. For example, pseudo candidate generator 305-*b* may calculate that search space candidates 310-*d* for aggregation level 315-*d* contain sixteen CCEs 320, search space candidates 310-*e* for aggregation level 315-*e* contain twenty CCEs 320, and search space candidates 310-*f* for aggregation level 315-*f* contain eight CCEs 320 (e.g., as before with FIG. 3A, but with a different reference aggregation level). As another aggregation level 315 has a greater CCE footprint than the reference aggregation level (e.g., aggregation level 315-*g* with no search space candidates 310 and, correspondingly, zero CCEs 320), pseudo candidate generator 305-*b* may add pseudo search space candidates 325-*b* to the reference aggregation level until the CCE footprint for the reference aggregation level is greater than or equal to the greatest CCE footprint for the other aggregation levels 315. Such an approach may efficiently utilize CCEs 320 in a configured CORESET or search space, as using aggregation level 1 as the reference aggregation level may result in adding pseudo search space candidates 325-*b* such that the footprint for the reference aggregation level is equal to, but not greater than, the greatest footprint for the other aggregation levels 315. For example, pseudo candidate generator 305-*b* may generate twenty pseudo search space candidates 325-*b* of aggregation level 1 and may nest the search space candidates 310 for the other aggregation levels 315 within the corresponding CCEs 320. Base station 105-*c* may stitch the candidates for aggregation level 315-*g* together and may perform hashing for higher aggregation levels 315 against the resulting CCEs 320. As shown in FIGS. 3A and 3B, using a large reference aggregation level may limit the number of pseudo search space candidates 325 to utilize, while using a small reference aggregation level may reduce the number of CCEs 320 needed for the search space (e.g., from twenty-four CCEs 320 in FIG. 3A to twenty CCEs 320 in FIG. 3B), allowing base station 105-*c* to configure more search spaces or search space candidates within a given TTI or bandwidth part CCE limit.

Figure 4A:
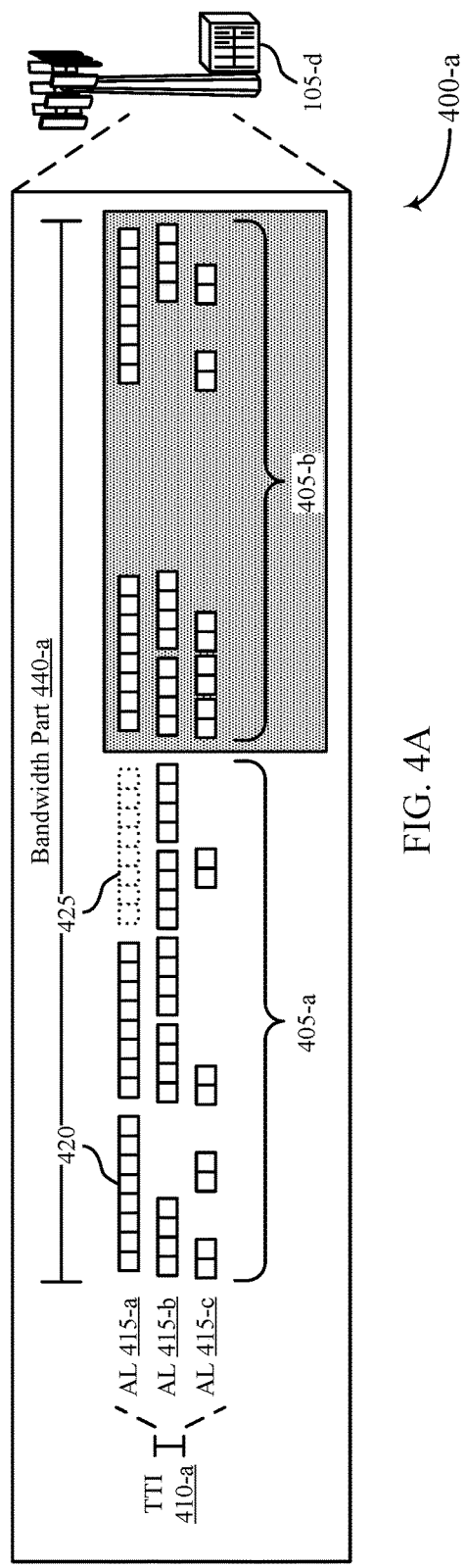
FIGS. 4A and 4B illustrate examples of overbooking handling procedures that support flexible search space configuration and overbooking handling in accordance with aspects of the present disclosure.
Figure 4B:
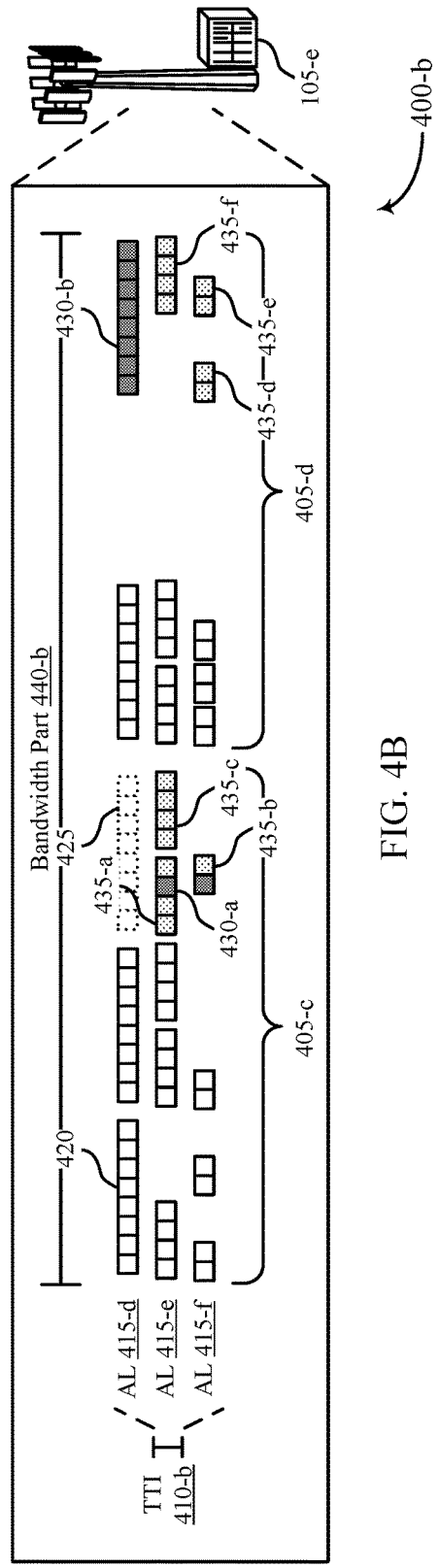

FIGS. 4A and 4B illustrate examples of overbooking handling procedures 400 that support flexible search space configuration and overbooking handling in accordance with aspects of the present disclosure. FIG. 4A illustrates an overbooking handling procedure 400-*a* at the CORESET or search space level. For example, a base station 105, such as base station 105-*d*, may configure a search space configuration within a TTI 410-*a* (e.g., a symbol, a slot, a subframe, etc.). Base station 105-*d* may be an example of a base station 105 as described herein, for example, with reference to FIGS. 1 through 3. The search space configuration may include one or more CORESETs 405 within the TTI 410-*a*. In some cases, there may be a maximum supported number of CORESETs 405 for a TTI 410-*a* (e.g., three CORESETs 405 for a bandwidth part 440-*a*). As illustrated, base station 105-*d* may configure the bandwidth part 440-*a* with CORE-SETs 405-*a* and 405-*b* contained within TTI 410-*a*. These CORESETs 405 may contain aggregation levels 415-*a*, 415-*b*, and 415-*c*, as well as aggregation level-specific search space candidates 420, pseudo search space candidates 425, or a combination of these. The search space candidates 420, pseudo search space candidates 425, or both within a CORESET 405 may be grouped into one or more search spaces (e.g., CSSs, UE specific search spaces, or both). However, it is to be understood that TTI 410-*a* may contain any number of CORESETs 405, aggregation levels 415, search space candidates 420, pseudo search space candidates 425, or search spaces.

After configuring the search spaces with a number of candidates in each CORESET 405, base station 105-*d* may calculate a CCE budget for each CORESET. For example, base station 105-*d* may determine the CCE budget using the following equation:

$$(N_{AL(AL_{ref})}N_{pseudo})*AL_{ref} \quad (2)$$

where the CCE budget is determined based on parameters of the reference aggregation level (e.g., due to nesting the other aggregation levels within the reference aggregation level, as described herein with respect to FIGS. 3A and 3B). As illustrated, aggregation level 415-*a* may be the reference aggregation level, and the CCE budgets for CORESETs 405-*a* and 405-*b* may be twenty-four CCEs and sixteen CCEs, respectively.

Base station 105-*d* may determine whether the total number of CCEs for the set of CORESETs 405 within the TTI 410-*a* (e.g., for bandwidth part 440-*a*) exceeds a CCE limit. If the sum of the CCE budgets is greater than the CCE limit, base station 105-*d* may determine to drop CCEs, search space candidates 420, CORESETs 405, or some combination thereof until the total number of CCEs within the TTI 410-*a* is equal to or below the CCE limit. Base station 105-*d* may determine the CCEs, candidates, or CORESETs 405 to drop based on one or more overbooking handling rules. The CCE limit may be an example of a total CCE limit for the TTI 410-*a* or may be a CCE limit per CORESET 405 or per bandwidth part 440 for the TTI 410-*a*. Additionally or alternatively, the CCE limit may be different for different TTIs 410.

For example, TTI 410-*a* may have a CCE limit of thirty-two CCEs. As the total CCE budget for CORESETs 405-*a* and 405-*b* exceed this CCE limit, base station 105-*d* may determine to drop CCEs from the search spaces. In some cases, one or more CORESETs 405 may include portions within TTI 410-*a*, but may span past the edges of TTI 410-*a*. In these cases, base station 105-*d* may determine the number of total CCEs within the TTI 410-*a* (e.g., not including CCEs for the CORESETs 405 that are positioned outside of the TTI 410-*a*), or may determine the number of total CCEs for any CORESETs 405 with at least a portion within TTI 410-*a*.

In some cases, base station 105-*d* may drop CCEs with a dropping resolution of entire CORESETs 405. For example, base station 105-*d* may select a CORESET 405 to drop (e.g., CORESET 405-*b*), and may drop the selected CORESET, along with all associated candidates and CCEs, from the search space configuration. In this case, based on the dropping, base station 105-*d* may transmit control information in the search space candidates 420 within CORESET 405-*a*, and may not transmit control information in any resources of CORESET 405-*b*.

Base station 105-*d* may select or determine the CORE-SET 405 to drop based on a priority value of the CORESET, an identifier of the CORESET, a type of search space included in the CORESET, or some combination of these parameters. For example, one or more overbooking handling rules may specify which of these parameters to use in order to determine the CCEs to drop. In a first example, base station 105-*d* may configure CORESETs 405 with explicit priority values. As illustrated, base station 105-*d* may configure CORESET 405-*b* with a lower priority value than CORESET 405-*a*. Accordingly, when base station 105-*d* determines to drop a CORESET 405 based on a limit, base station 105-*d* may drop CORESET 405-*b* based on the lower priority value. Base station 105-*d* may signal these priority values with a search space configuration so that a UE 115 may also determine the order of CORESETs 405 to drop. In a second example, base station 105-*d* may drop a CORESET 405 based on an identifier of the CORESET, or based on other CORESET-specific information. For example, base station 105-*d* may drop the CORESET 405 (e.g., CORESET 405-*b*) with the higher CORESET identifier value. In these cases, CORESETs 405 are dropped based on information implicit to the CORESET 405, so base station 105-*d* may not transmit explicit information related to CORESET 405 dropping. In some cases, base station 105-*d* may utilize a combination of priority values and CORESET-specific information. For example, if two or more CORESETs 405 share a same priority value, base station 105-*d* may determine which of the two or more CORESETs 405 to drop first based on CORESET-specific information (e.g., the CORE-SET identifier).

In some cases, base station 105-*d* may refrain from dropping CORESETs 405 containing a CSS. For example, base station 105-*d* may identify any CORESETs 405 including search space candidates 420 corresponding to a CSS and may select the one or more CORESETs 405 to drop from the CORESETs 405 not identified by the base station 105-*d*. For example, the CORESETs 405 may correspond to (e.g., contain) CSSs, UE specific search spaces, or a combination of the two.

In the cases where a CORESET 405 includes search space candidates 420 for both a CSS and a UE specific search space, the CSS may have a CSS-specific nested structure (e.g., where candidates on different aggregation levels 415 corresponding to the CSS will be nested under a CSS CCE footprint). In some implementations, to handle the UE specific search space or spaces, base station 105-*d* may additionally include a UE specific search space nested structure. In these cases, depending on the overlap between the CSS and UE specific search space nested structures on a reference aggregation level, the amount of CCEs consumed per CORESET 405 may vary with time or frequency (e.g., more CCEs are consumed in CORESETs 405 with both a CSS and multiple UE specific search spaces). In other implementations, base station 105-*d* may implement a joint nested structure, where UE specific search spaces may have a nested structure from a reference aggregation level, and may additionally nest UE specific search space candidates under the CSS footprint. Similar to the first implementation, the amount of CCEs consumed per CORESET 405 may again vary with time or frequency. In yet other implementations, base station 105-*d* may implement a UE specific search space nested structure mutually exclusive from the CSS nested structure, such that no CCEs are shared between the two structures. In this implementation, the amount of CCEs consumed per CORESET 405 may be fixed over time, even if a CSS and a UE specific search space are included in a same CORESET 405 or TTI 410.

FIG. 4B illustrates an overbooking handling procedure 400-*b* at the candidate or search space level. For example, a base station 105, such as base station 105-*e*, may configure a search space configuration within a TTI 410-*b* (e.g., a slot). Base station 105-*e* may be an example of a base station 105 as described herein, for example, with reference to FIGS. 1 through 4B. The search space configuration may include one or more CORESETs 405 within the TTI 410-*b*. As illustrated, base station 105-*e* may configure a bandwidth part 440-*b* with CORESETs 405-*c* and 405-*d* contained within TTI 410-*b*. These CORESETs 405 may contain aggregation levels 415-*d*, 415-*e*, and 415-*f*, as well as aggregation level-specific search space candidates 420, pseudo search space candidates 425, or a combination of these.

Base station 105-*e* may determine to drop CCEs in order to meet a CCE limit within TTI 410-*b* as discussed herein, for example, with reference to FIG. 4A. In some cases, base station 105-*d* may drop CCEs with a dropping resolution of search space candidates 420 or pseudo search space candidates 425, rather than entire CORESETs 405. In some cases, this dropping resolution may be referred to as fractional CORESET dropping. In fractional CORESET dropping, base station 105-*e* may determine a candidate to drop, and may additionally drop all candidates on other aggregation levels 415 overlapping with the determined candidate. In this way, base station 105-*e* may reduce the total number of CCEs by a number corresponding to the largest aggregation level of a dropped search space candidate 420.

In a first implementation, base station 105-*e* may select a candidate to drop. In some cases, base station 105-*e* may select the candidate to drop from the reference aggregation level (e.g., aggregation level 415-*d*). In other cases, base station 105-*e* may select the candidate to drop from the highest aggregation level, the lowest aggregation level, a pre-defined aggregation level, or any aggregation level 415. If selecting a candidate from the reference aggregation level, base station 105-*e* may select from the combination of search space candidates 420 and pseudo search space candidates 425, or may select from only search space candidates 420 or only pseudo search space candidates 425 initially.

In one specific example, base station 105-*e* may determine to drop search space candidate 430-*b*. For example, base station 105-*e* may select a candidate from the highest aggregation level to drop. In some cases, determining the candidate to drop may be based on a candidate index, a DCI format associated with the candidate, or an RNTI. Additionally or alternatively, base station 105-*e* may first determine a CORESET 405 (e.g., based on a priority value or a CORESET-specific parameter), and then may determine a candidate to drop from within the CORESET 405. If base station 105-*e* selects or determines candidate 430-*b* to drop, base station 105-*e* may additionally drop any candidates overlapping with candidate 430-*b*, such as candidates 435-*d*, 435-*e*, and 435-*f*. After dropping these candidates, the updated CCE budget for CORESET 405-*d* may be eight CCEs.

Base station 105-*e* may compare the updated total number of CCEs for TTI 410-*b*, bandwidth part 440-*b*, or both to a CCE limit for TTI 410-*b*, bandwidth part 440-*b*, or both. If the updated total number of CCEs is equal to or below the CCE limit, base station 105-*e* may send this updated search space configuration to a UE 115. However, if the updated total number of CCEs is still greater than the CCE limit, base station 105-*e* may determine one or more additional search space candidates 420 to drop. In some examples, base station 105-*e* may perform candidate dropping within a single CORESET 405 before dropping candidates from other CORESETs 405. For example, after dropping candidate 430-*b*, base station 105-*e* may continue to drop candidates from CORESET 405-*d* until the CCE limit is met, or every candidate in CORESET 405-*d* is dropped. In the latter case, base station 105-*e* may then select an additional CORESET 405, and may begin dropping candidates from the additional CORESET 405. In other examples, base station 105-*e* may implement rotating CORESETs 405 for candidate dropping. For example, after dropping candidate 430-*b*, base station 105-*e* may select a different CORESET 405 than CORESET 405-*b* and may determine a candidate to drop from the different CORESET 405. In these examples, base station 105-*e* may only drop an additional candidate from CORESET 405-*d* if a candidate has been dropped from every eligible CORESET 405 within TTI 410-*b* first. "Eligible" CORESETs 405 may refer to all CORESETs 405 within TTI 410-*b*, or may refer to a subset of CORESETs 405 (e.g., CORESETs 405 not containing a CSS).

In a second implementation, base station 105-*e* may select a CCE to drop. For example, base station 105-*e* may select CCE 430-*a* to drop. In this case, base station 105-*e* may drop any candidates that contain the selected CCE 430-*a*, as well as any other candidates overlapping with the dropped candidates. As illustrated, if base station 105-*e* determines to drop CCE 430-*a*, base station 105-*e* may drop search space candidates 435-*a* and 435-*b*, as well as the pseudo search space candidate 425, that all contain CCE 430-*a*. Additionally, base station 105-*e* may drop search space candidate 435-*c* that, while not containing CCE 430-*a*, overlaps with the dropped pseudo search space candidate 425. In this way, base station 105-*e* may reduce the total CCE number for the search space by eight CCEs. In some cases, base station 105-*e* may determine the CCE 430-*a* to drop based on a parameter, identifier, or priority level of the CCE 430-*a*.

When performing candidate-level dropping, base station 105-*e* may perform mapping of candidates to CCEs either before or after the dropping procedure. For example, in a first implementation, base station 105-*e* may map the search space candidates 420 and pseudo search space candidates 425 to CCEs before dropping CCEs. In this implementation, base station 105-*e* may determine which candidates for different aggregation levels 415 overlap in CCEs and may drop candidates based on this overlapping. In a second implementation, base station 105-*e* may drop candidates before mapping the candidates to CCEs. In this implementation, base station 105-*e* may determine a number of CCEs for an aggregation level 415 (e.g., the reference aggregation level) after dropping one or more candidates. Base station 105-*e* may then drop candidates from the other aggregation levels 415 until the other aggregation levels have the same or smaller numbers of CCEs. After base station 105-*e* has dropped enough candidates that the total number of CCEs remaining in TTI 410-*b*, bandwidth part 440-*b*, or both is less than or equal to the CCE limit for TTI 410-*b*, bandwidth part 440-*b*, or both, base station 105-*e* may map the remaining candidates to CCEs in the a CORESET 405 (e.g., based on a hashing function).

In some cases, base station 105-*e* may additionally or alternatively drop CCEs, candidates, search spaces, or CORESETs 405 based on a blind decoding attempts limit for a UE 115. For example, base station 105-*e* may overbook the search space configuration past a CCE limit, a blind decoding limit, or both. In some cases, base station 105-*e* may first utilize overbooking handling rules to bring a total number of CCEs below a CCE limit. However, if the number of CCEs or the number of search space candidates 420 still exceeds a blind decoding attempts limit, base station 105-*e* may further drop CCEs, candidates, search spaces, or CORESETs 405 to meet the blind decoding attempts limit. Base station 105-*e* may perform this dropping according to additional overbooking handling rules (e.g., blind decoding overbooking rules). In some cases, these blind decoding overbooking rules may specify to drop candidates according to a CORESET priority value, a CORESET identifier, a candidate index, an aggregation level 415, a DCI format associated with a candidate, an RNTI, or some similar parameter. For example, a UE 115 may have a maximum number of search space candidates 420 that the UE 115 can monitor for or decode within TTI 410-*b*, bandwidth 440-*b*, or both. Base station 105-*e* may select a CORESET 405 with a lower priority value or a higher CORESET identifier value, and may select a candidate within the CORESET 405 to drop based on a higher candidate index and a lower aggregation level 415. Alternatively, base station 105-*e* may drop a candidate associated with a particular RNTI. When handling blind decoding overbooking, base station 105-*e* may not drop all candidates on other aggregation levels 415 overlapping in CCEs with the dropped candidate (e.g., as the blind decoding attempts limit may be based on a number of candidates to decode, as opposed to a number of CCEs).

In all of the cases described herein, base stations 105 are described as performing the pseudo search space candidate generation and CCE dropping procedures. However, in some cases, UEs 115 may perform similar functions to determine a search space configuration, and may monitor for control information based on determining the pseudo search space candidates or dropped CCEs or search space candidates. In other cases, the base stations 105 may transmit search space configurations to the UEs 115, where the search space configurations may include indications of pseudo candidates, dropped CCEs, dropped candidates, or dropped CORESETs, or a combination of these. In these cases, the UEs 115 may monitor and decode information transmitted in the search space(s) based on receiving the configurations from the base stations 105.

Figure 5:
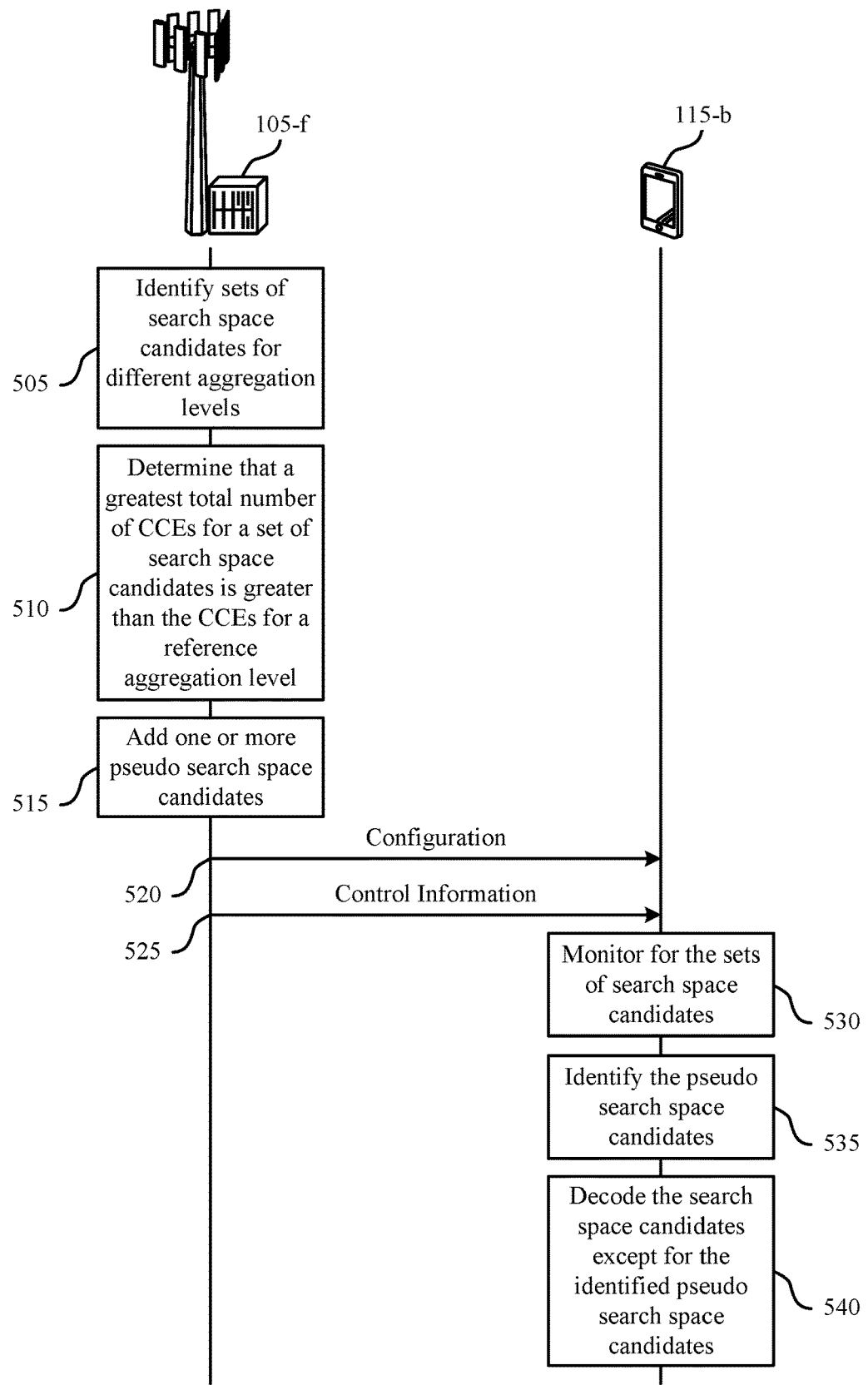
FIGS. 5 and 6 illustrate examples of process flows that support flexible search space configuration and overbooking handling in accordance with aspects of the present disclosure.

FIG. 5 illustrates an example of a process flow 500 that supports flexible search space configuration and overbooking handling in accordance with aspects of the present disclosure. The process flow 500 may include base station 105-*f* and UE 115-*b*, which may be examples of the corresponding devices as described with reference to FIGS. 1 through 4. Base station 105-*f* may determine a flexible search space configuration for UE 115-*b*, and may transmit an indication of the search space configuration, along with DCI, to UE 115-*b*. Alternatively, UE 115-*b* may perform one or more of the processes described with respect to base station 105-*f* in order to determine the search space configuration.

At 505, base station 105-*f* may identify sets of search space candidates for different aggregation levels. For example, base station 105-*f* may support a number of aggregation levels. Each set of search space candidates may be aggregation level-specific, and the search space candidates may span a number of CCEs corresponding to the aggregation level. These aggregation levels may contain a reference aggregation level and one or more additional aggregation levels, where the additional aggregation levels will be nested within the reference aggregation level. The sets of search space candidates may correspond to a single search space or multiple search spaces for a CORESET.

At 510, base station 105-*f* may calculate a total number of CCEs for each set of aggregation level-specific search space candidates. Base station 105-*f* may determine that the greatest total number of CCEs for one of the additional aggregation levels is greater than the total number of CCEs for the reference aggregation level. Accordingly, as is, base station 105-*f* may not be able to nest the additional aggregation level with the greatest number of CCEs within the reference aggregation level.

At 515, base station 105-*f* may add one or more pseudo search space candidates to the reference aggregation levels. For example base station 105-*f* may add a number of pseudo search space candidates to the reference aggregation level such that the combined CCEs for the search space candidates and pseudo search space candidates at the reference aggregation level is greater than or equal to the calculated greatest number of CCEs for the additional aggregation levels. Base station 105-*f* may nest the search space candidates for the additional aggregation levels within the CCE footprint of the reference aggregation level.

At 520, base station 105-*f* may transmit an indication of the search space configuration to UE 115-*b*, where the search space configuration includes an indication of the one or more added pseudo search space candidates.

At 525, base station 105-*f* may transmit control information within the configured search space. Base station 105-*f* may transmit DCI within one or more search space candidates at the different aggregation levels, but may not transmit DCI within the pseudo search space candidates at the reference aggregation level. These pseudo search space candidates may be used for nesting other candidates and defining the size of the search space, but may not be used for transmitting control information.

At 530, UE 115-*b* may monitor for the sets of search space candidates according to the search space configuration. At 535, UE 115-*b* may identify the one or more pseudo search space candidates at the reference aggregation level. At 540, UE 115-*b* may attempt to decode the search space candidates, not including the pseudo search space candidates. For example, UE 115-*b* may identify the pseudo search space candidates, determine that these candidates do not include information to be decoded, and refrain from decoding the pseudo search space candidates. In other cases, UE 115-*b* may not receive an indication of the pseudo search space candidates.

Figure 6:
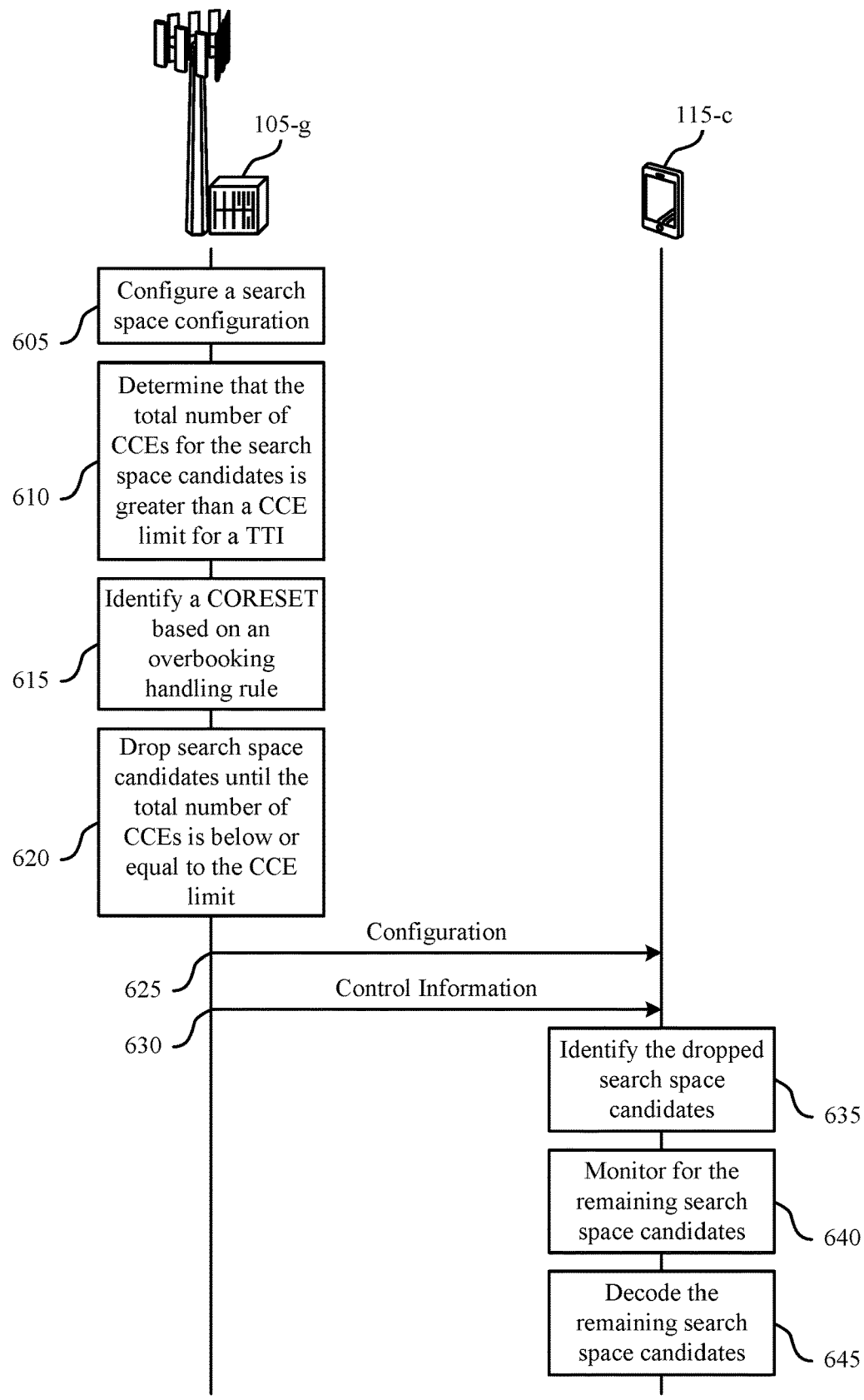

FIG. 6 illustrates an example of a process flow 600 that supports flexible search space configuration and overbooking handling in accordance with aspects of the present disclosure. The process flow 600 may include base station 105-*g* and UE 115-*c*, which may be examples of the corresponding devices as described with reference to FIGS. 1 through 5. Base station 105-*g* may configure one or more search spaces for UE 115-*c*. However, base station 105-*g* may overbook the search space(s) (e.g., with regards to a CCE limit, a blind decoding attempts limit, or both), and determine CCEs to drop from the search space(s) to meet the limit. Base station 105-*g* may transmit an indication of the search space configuration, including the dropped CCEs, to UE 115-*c*, and UE 115-*c* may monitor the channel based on the received search space configuration. Alternatively, UE 115-*c* may perform one or more of the processes described with respect to base station 105-*g* in order to determine the search space configuration.

At 605, base station 105-*g* may configure a search space configuration including one or more CORESETs. The search space configuration may be within a TTI, such as a slot. The one or more CORESETs may be configured within a bandwidth part and may contain one or more search space candidates (e.g., for a CSS, one or more UE specific search spaces, or a combination thereof).

At 610, base station 105-g may determine that the total number of CCEs within the one or more search space candidates is greater than a CCE limit (e.g., for the TTI, for the bandwidth part, etc.). In this case, base station 105-g may determine that the search space configuration is overbooked.

To handle the overbooking of the search space configuration, at 615, base station 105-g may identify a CORESET of the one or more CORESETs based on an overbooking rule. For example, base station 105-g may identify the CORESET based on a priority value of the CORESET, an identifier of the CORESET, or some other parameter of the CORESET. In some cases (e.g., in fractional CORESET dropping), base station 105-g may additionally determine a search space candidate within the CORESET.

At 620, base station 105-g may drop search space candidates from the search space configuration until the total number of CCEs within the TTI, bandwidth part, or both is less than or equal to the CCE limit of the TTI, bandwidth part, or both. For example, in CORESET dropping, base station 105-g may drop the identified CORESET, while in fractional CORESET dropping, base station 105-g may drop the identified search space candidates. Additionally, base station 105-g may drop any candidates on different aggregation levels that overlap with the identified candidates to drop. In some cases, base station 105-g may drop search space candidates from additional CORESETs to meet the CCE limit. Additionally or alternatively, base station 105-g may drop search space candidates to meet a blind decoding attempts limit for UE 115-c. Base station 105-g may configure the search space configuration with the remaining CCEs following the dropping procedure.

At 625, base station 105-g may transmit an indication of the search space configuration to UE 115-c, where the search space configuration includes an indication of the dropped CCEs (e.g., the dropped candidates or CORESETs).

At 630, base station 105-g may transmit control information within the configured search space candidates. Base station 105-g may transmit DCI within one or more of the remaining search space candidates at different aggregation levels, but may not transmit DCI where the CCEs (e.g., the search space candidates) were dropped.

At 635, UE 115-c may identify the one or more dropped search space candidates from the search configuration. At 640, UE 115-c may monitor for the remaining sets of search space candidates according to the search space configuration. These sets of search space candidates may correspond to different search spaces. At 645, UE 115-c may attempt to decode the remaining CCEs (e.g., the remaining search space candidates).

Figure 7:
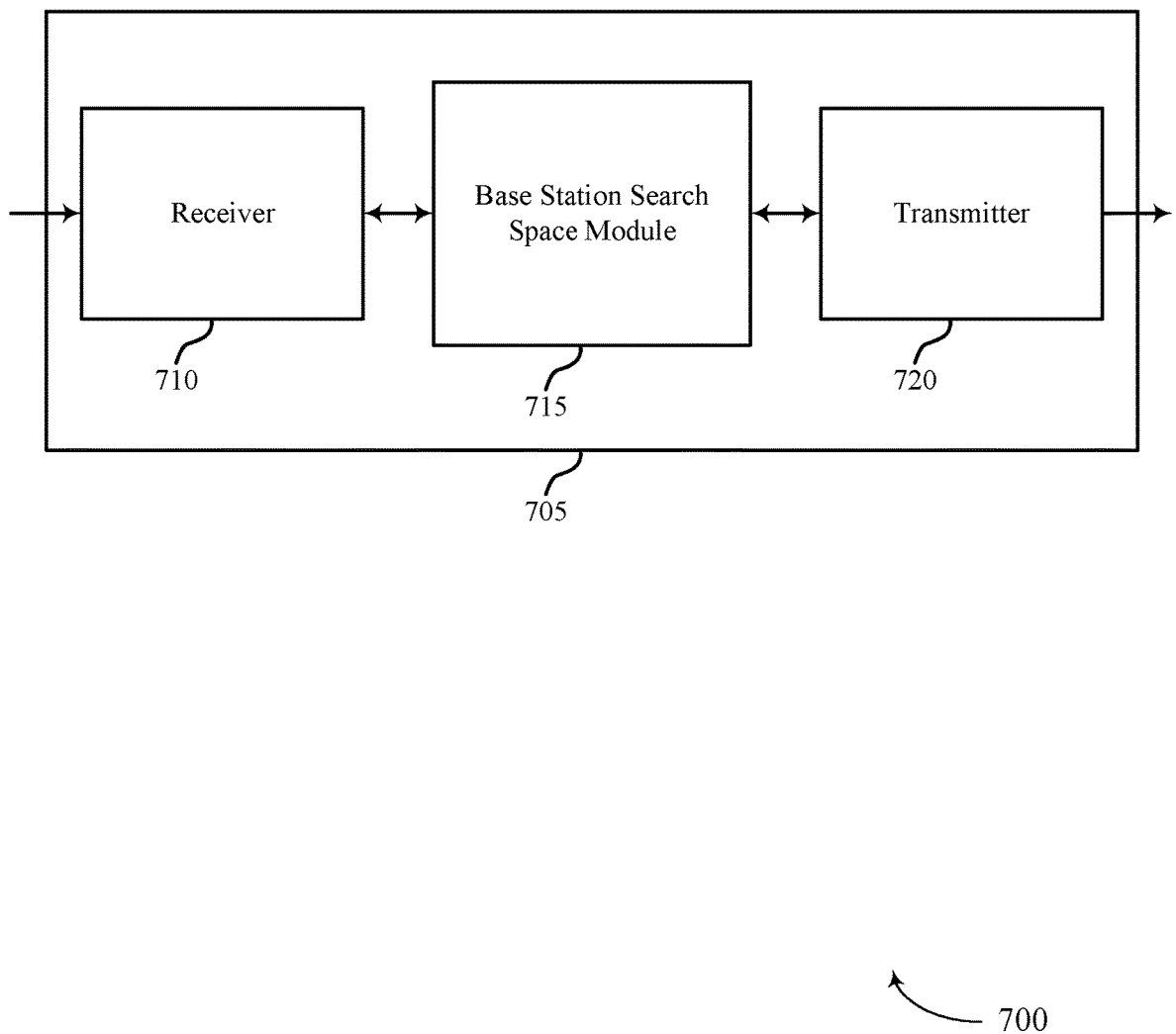
FIGS. 7 through 9 show block diagrams of a device that supports flexible search space configuration and overbooking handling in accordance with aspects of the present disclosure.

FIG. 7 shows a block diagram 700 of a wireless device 705 that supports flexible search space configuration and overbooking handling in accordance with aspects of the present disclosure. Wireless device 705 may be an example of aspects of a base station 105 as described herein. Wireless device 705 may include receiver 710, base station search space module 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to flexible search space configuration and overbooking handling, etc.). Information may be passed on to other components of the device. The receiver 710 may be an example of aspects of the transceiver 1035 described with reference to FIG. 10. The receiver 710 may utilize a single antenna or a set of antennas.

Base station search space module 715 may be an example of aspects of the base station search space module 1015 described with reference to FIG. 10. Base station search space module 715 and/or at least some of its various sub-components may be implemented in hardware, software executed by a processor, firmware, or any combination thereof. If implemented in software executed by a processor, the functions of the base station search space module 715 and/or at least some of its various sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure. The base station search space module 715 and/or at least some of its various sub-components may be physically located at various positions, including being distributed such that portions of functions are implemented at different physical locations by one or more physical devices. In some examples, base station search space module 715 and/or at least some of its various sub-components may be a separate and distinct component in accordance with various aspects of the present disclosure. In other examples, base station search space module 715 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

In some cases, base station search space module 715 may identify multiple sets of search space candidates for a search space, where each set of search space candidates corresponds to a different aggregation level of a set of aggregation levels, and where the set of aggregation levels includes a reference aggregation level and one or more additional aggregation levels. The base station search space module 715 may calculate a total number of CCEs for each set of search space candidates and may determine that a greatest total number of CCEs for a set of search space candidates corresponding to an additional aggregation level is greater than a total number of CCEs for a set of search space candidates corresponding to the reference aggregation level. The base station search space module 715 may add one or more pseudo search space candidates to the set of search space candidates corresponding to the reference aggregation level until the total number of CCEs for the set of search space candidates corresponding to the reference aggregation level is greater than or equal to the greatest total number of CCEs for the set of search space candidates corresponding to the additional aggregation level and may transmit control information within the search space.

Additionally or alternatively, the base station search space module 715 may configure a UE with one or more CORESETs in a bandwidth part, where the one or more CORESETs include one or more search space candidates, and may determine that a total number of CCEs configured for the one or more search space candidates within a TTI is greater than a CCE limit for the TTI. The base station search space module 715 may identify a CORESET of the one or more CORESETs based on an overbooking handling rule, drop one or more search space candidates from the identified CORESET until a total number of remaining CCEs of the one or more CORESETs within the TTI is less than or equal to the CCE limit for the TTI, and transmit control information within one or more remaining search space candidates including the remaining CCEs of the one or more CORESETs.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
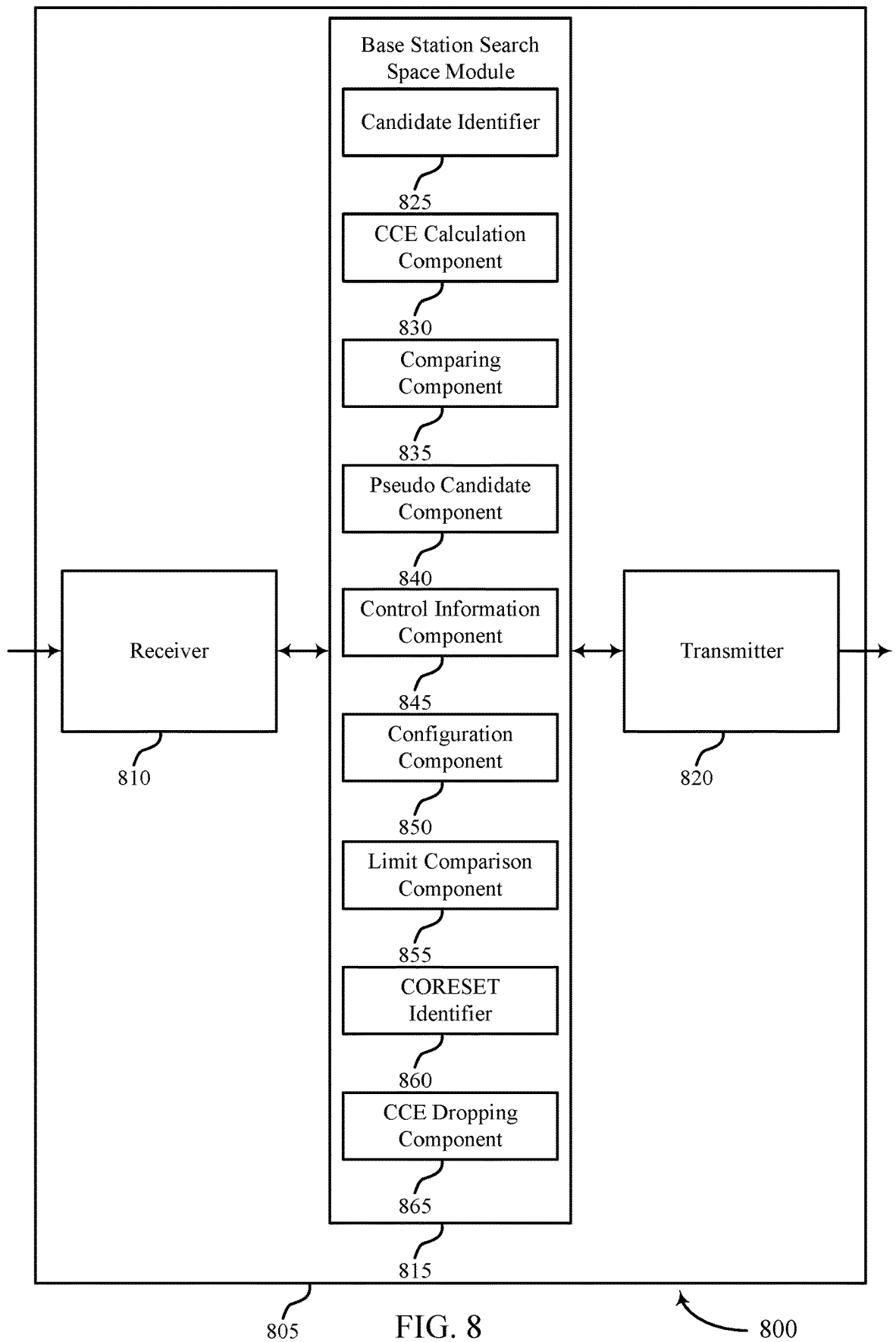

FIG. 8 shows a block diagram 800 of a wireless device 805 that supports flexible search space configuration and overbooking handling in accordance with aspects of the present disclosure. Wireless device 805 may be an example of aspects of a wireless device 705 or a base station 105 as described with reference to FIGS. 1 through 7. Wireless device 805 may include receiver 810, base station search space module 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to flexible search space configuration and overbooking handling, etc.). Information may be passed on to other components of the device. The receiver 810 may be an example of aspects of the transceiver 1035 described with reference to FIG. 10. The receiver 810 may utilize a single antenna or a set of antennas.

Base station search space module 815 may be an example of aspects of the base station search space module 1015 described with reference to FIG. 10. Base station search space module 815 may also include candidate identifier 825, CCE calculation component 830, comparing component 835, pseudo candidate component 840, control information component 845, configuration component 850, limit comparison component 855, CORESET identifier 860, CCE dropping component 865, or some combination thereof.

Candidate identifier 825 may identify multiple sets of search space candidates for a search space, where each set of search space candidates corresponds to a different aggregation level of a set of aggregation levels, and where the set of aggregation levels includes a reference aggregation level and one or more additional aggregation levels.

CCE calculation component 830 may calculate a total number of CCEs for each set of search space candidates. Comparing component 835 may determine that a greatest total number of CCEs for a set of search space candidates corresponding to an additional aggregation level is greater than a total number of CCEs for a set of search space candidates corresponding to the reference aggregation level.

Pseudo candidate component 840 may add one or more pseudo search space candidates to the set of search space candidates corresponding to the reference aggregation level until the total number of CCEs for the set of search space candidates corresponding to the reference aggregation level is greater than or equal to the greatest total number of CCEs for the set of search space candidates corresponding to the additional aggregation level. Control information component 845 may transmit control information within the search space.

Configuration component 850 may configure a UE with one or more CORESETs in a bandwidth part, where the one or more CORESETs include one or more search space candidates. Limit comparison component 855 may determine that a total number of CCEs configured for the one or more search space candidates within a TTI is greater than a CCE limit for the TTI.

CORESET identifier 860 may identify a CORESET of the one or more CORESETs based on an overbooking handling rule. CCE dropping component 865 may drop one or more search space candidates from the identified CORESET until a total number of remaining CCEs of the one or more CORESETs within the TTI is less than or equal to the CCE limit for the TTI. Control information component 845 may transmit control information within one or more remaining search space candidates containing the remaining CCEs of the one or more CORESETs.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
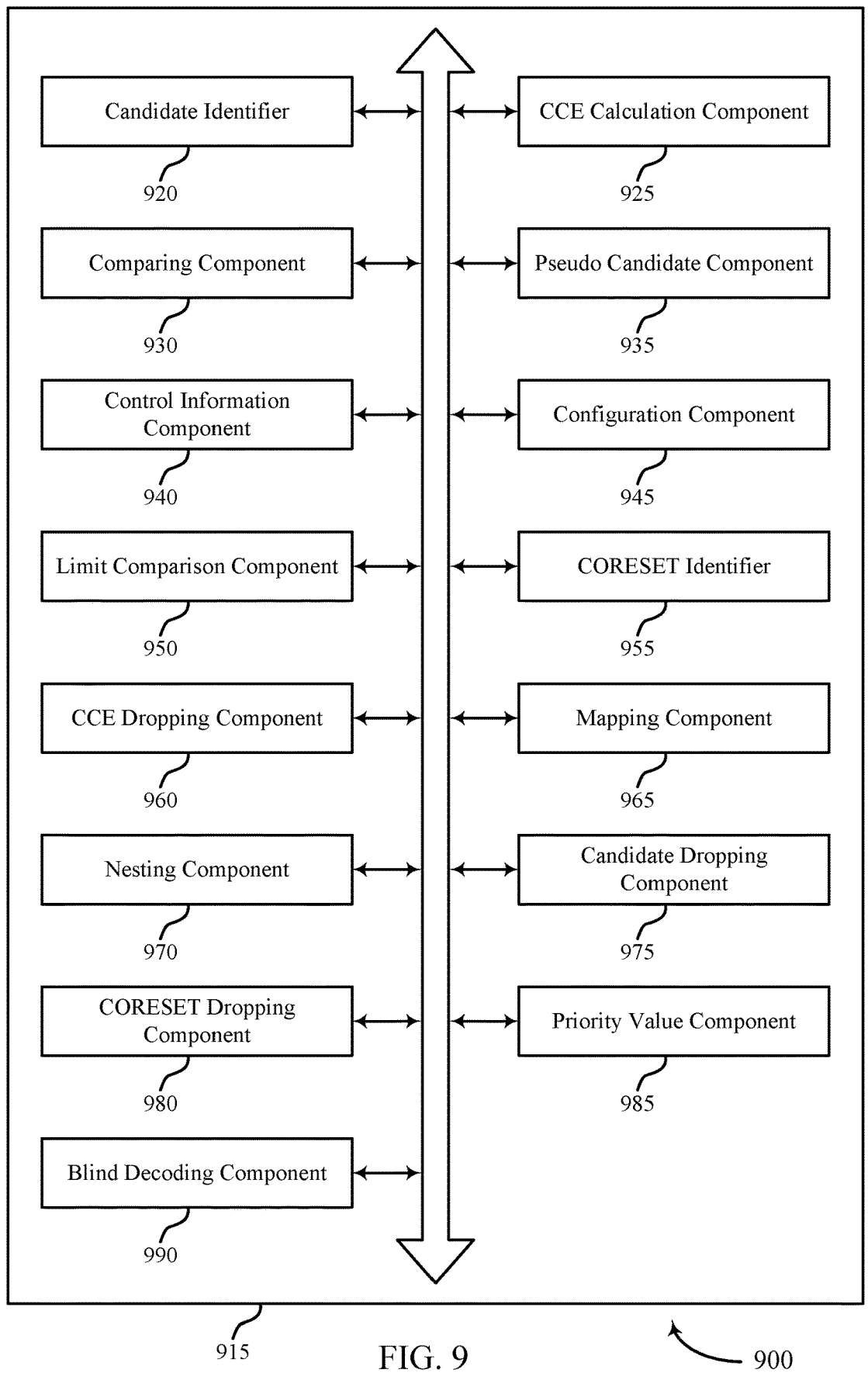

FIG. 9 shows a block diagram 900 of a base station search space module 915 that supports flexible search space configuration and overbooking handling in accordance with aspects of the present disclosure. The base station search space module 915 may be an example of aspects of a base station search space module 715, 815, or 1015 described with reference to FIGS. 7, 8, and 10. The base station search space module 915 may include candidate identifier 920, CCE calculation component 925, comparing component 930, pseudo candidate component 935, control information component 940, configuration component 945, limit comparison component 950, CORESET identifier 955, CCE dropping component 960, mapping component 965, nesting component 970, candidate dropping component 975, CORESET dropping component 980, priority value component 985, blind decoding component 990, or some combination thereof. Each of these modules may communicate, directly or indirectly, with one another (e.g., via one or more buses).

In a first implementation, candidate identifier 920 may identify multiple sets of search space candidates for a search space, where each set of search space candidates corresponds to a different aggregation level of a set of aggregation levels, and where the set of aggregation levels includes a reference aggregation level and one or more additional aggregation levels. In some cases, the reference aggregation level is a highest aggregation level of the set of aggregation levels, a lowest aggregation level of the set of aggregation levels, a pre-defined aggregation level, or a combination thereof. In some cases, the search space corresponds to a CORESET. In some cases, the multiple sets of search space candidates include PDCCH candidates.

CCE calculation component 925 may calculate a total number of CCEs for each set of search space candidates. In some cases, a total number of CCEs corresponding to a TTI for the search space exceeds a CCE limit for the TTI. In some cases, a total number of blind decoding attempts corresponding to a TTI for the search space exceeds a blind decoding attempt limit for the TTI.

Comparing component 930 may determine that a greatest total number of CCEs for a set of search space candidates corresponding to an additional aggregation level is greater than a total number of CCEs for a set of search space candidates corresponding to the reference aggregation level.

Pseudo candidate component 935 may add one or more pseudo search space candidates to the set of search space candidates corresponding to the reference aggregation level until the total number of CCEs for the set of search space candidates corresponding to the reference aggregation level is greater than or equal to the greatest total number of CCEs for the set of search space candidates corresponding to the additional aggregation level. In some cases, the CCEs corresponding to the one or more pseudo search space candidates are configured to be free from control information at the reference aggregation level. Control information component 940 may transmit control information within the search space.

Mapping component 965 may map the one or more pseudo search space candidates and the set of search space candidates corresponding to the reference aggregation level to a set of CCEs. Nesting component 970 may nest, within the set of CCEs, each set of search space candidates corresponding to the one or more additional aggregation levels. In some cases, the nesting is based on a CCE limit for a TTI.

In some cases, mapping component 965 may map the one or more pseudo search space candidates and the set of search space candidates corresponding to the reference aggregation level to a set of CCEs according to a hashing function. Additionally or alternatively, mapping component 965 may map each set of search space candidates corresponding to the one or more additional aggregation levels to CCEs within the set of CCEs according to a hashing function.

In some cases, the search space includes a CSS, a UE specific search space, or a combination thereof. For example, in some cases, the multiple sets of search space candidates may include multiple sets of CSS candidates and multiple sets of UE specific search space candidates (e.g., within different search spaces). Mapping component 965 may map a set of CSS candidates of the multiple sets of CSS candidates corresponding to a CSS reference aggregation level to a first set of CCEs. Nesting component 970 may nest, within the first set of CCEs, each other set of CSS candidates of the multiple sets of CSS candidates.

Mapping component 965 may additionally map a set of UE specific search space candidates of the multiple sets of UE specific search space candidates corresponding to a UE specific search space reference aggregation level to a second set of CCEs. The CSS reference aggregation level and the UE specific search space reference aggregation may be a same aggregation level. In some cases, nesting component 970 may nest, within the second set of CCEs, each other set of UE specific search space candidates of the multiple sets of UE specific search space candidates. The first set of CCEs and the second set of CCEs may overlap, or the first set of CCEs and the second set of CCEs may be mutually exclusive. In other cases, nesting component 970 may nest, within the first set of CCEs and the second set of CCEs, each other set of UE specific search space candidates of the multiple sets of UE specific search space candidates.

In a second implementation, configuration component 945 may configure a UE with one or more CORESETs (e.g., in a bandwidth part). The one or more CORESETs may include one or more search space candidates. In some cases, at least one CORESET of the one or more CORESETs includes a number of search space candidates that overlap in CCEs for different aggregation levels.

Limit comparison component 950 may determine that a total number of CCEs configured for the one or more search space candidates within a TTI is greater than a CCE limit for the TTI. In some cases, limit comparison component 950 may calculate a number of CCEs of each CORESET of the one or more CORESETs based on a reference aggregation level for each CORESET and a number of search space candidates corresponding to the reference aggregation level, a number of pseudo search space candidates corresponding to the reference aggregation level, or a combination thereof. In some cases, the TTI may be an example of a slot.

CORESET identifier 955 may identify a CORESET of the one or more CORESETs based on an overbooking handling rule. In some cases, CORESET identifier 955 may identify an additional CORESET of the one or more CORESETs based on the overbooking handling rule. In some cases, identifying the additional CORESET is further based on dropping every search space candidate of the identified CORESET and determining that dropping the every search space candidate of the identified CORESET results in the total number of remaining CCEs of the one or more CORESETs within the TTI being greater than the CCE limit for the TTI. In other cases, identifying the additional CORESET is further based on dropping a first search space candidate of the identified CORESET and determining that dropping the first search space candidate of the identified CORESET results in the total number of remaining CCEs of the one or more CORESETs within the TTI being greater than the CCE limit for the TTI.

In some cases, identifying the CORESET based on the overbooking handling rule includes identifying the CORESET according to a priority value of the CORESET. In some cases, identifying the CORESET based on the overbooking handling rule includes identifying the CORESET according to a CORESET identifier. In some cases, identifying the CORESET based on the overbooking handling rule includes determining at least one CORESET of the one or more CORESETs that does not include a CSS and identifying the CORESET from the determined at least one CORESET.

CCE dropping component 960 may drop one or more search space candidates from the identified CORESET until a total number of remaining CCEs of the one or more CORESETs within the TTI is less than or equal to the CCE limit for the TTI. In some cases, CCE dropping component 960 may drop one or more additional search space candidates from the identified additional CORESET until the total number of remaining CCEs of the one or more CORESETs within the TTI is less than or equal to the CCE limit for the TTI.

In some cases, dropping the one or more search space candidates from the identified CORESET includes a candidate identifier 920 determining a search space candidate of the identified CORESET to drop. In some cases, the search space candidate is determined based on a candidate index for the search space candidate, a control information format associated with the search space candidate, an RNTI, or a combination thereof. Candidate dropping component 975 may drop the determined search space candidate and any additional search space candidates that include CCEs overlapping with CCEs corresponding to the determined search space candidate. In other cases, dropping the one or more search space candidates from the identified CORESET includes a CORESET dropping component 980 dropping a subset of CCEs for the identified CORESET (e.g., in a fractional CORESET dropping procedure) or dropping the identified CORESET.

In some cases, mapping component 965 may map sets of search space candidates corresponding to different aggregation levels within the remaining CCEs of the one or more CORESETs according to a hashing function. In other cases, mapping component 965 may map sets of search space candidates corresponding to different aggregation levels within the one or more CORESETs according to a hashing function and prior to dropping the one or more search space candidates.

Priority value component 985 may transmit an indication of priority values for the one or more CORESETs. In some cases, the identified CORESET includes a CSS, a UE specific search space, or a combination thereof. The one or more search space candidates (e.g., the dropped candidates) may correspond to the CSS, the UE specific search space, or the combination thereof.

Blind decoding component 990 may determine that a total number of blind decoding attempts for decoding the remaining search space candidates of the one or more CORESETs within the TTI is greater than a blind decoding attempt limit for the TTI. Blind decoding component 990 may identify one or more additional search space candidates of the one or more CORESETs to drop based on a blind decoding overbooking rule, and may drop the identified one or more additional search space candidates until the total number of remaining CCEs of the one or more CORESETs within the TTI is less than or equal to the blind decoding attempt limit for the TTI. In some cases, identifying the one or more additional search space candidates based on the blind decoding overbooking rule includes identifying each search space candidate according to a CORESET identifier, an index of the search space candidate, an aggregation level of the search space candidate, a control information format associated with the search space candidate, an RNTI, or a combination thereof.

Control information component 940 may transmit control information within one or more remaining search space candidates including the remaining CCEs of the one or more CORESETs.

Figure 10:
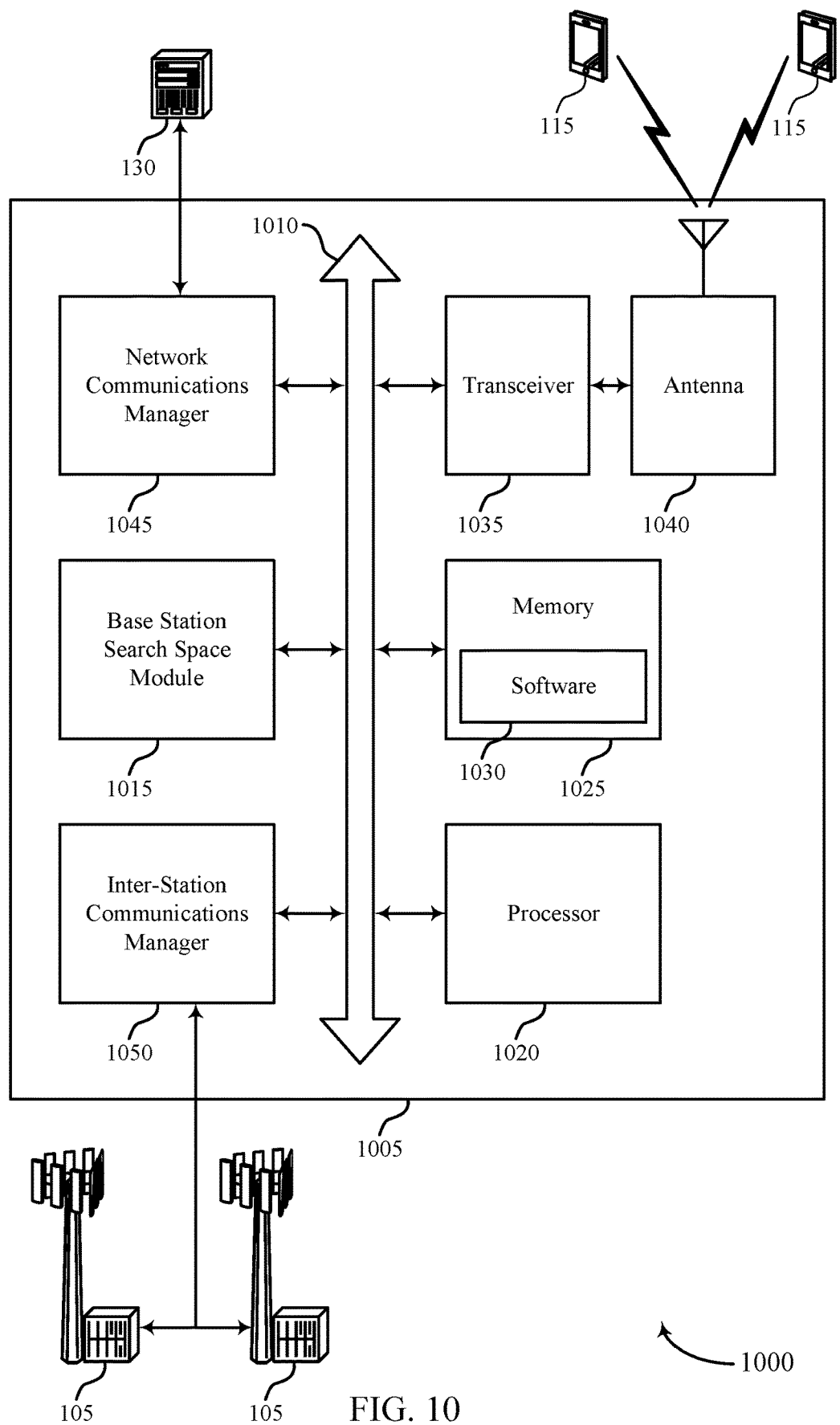
FIG. 10 illustrates a block diagram of a system including a base station that supports flexible search space configuration and overbooking handling in accordance with aspects of the present disclosure.

FIG. 10 illustrates a block diagram of a system 1000 including a device 1005 that supports flexible search space configuration and overbooking handling in accordance with aspects of the present disclosure. Device 1005 may be an example of or include the components of wireless device 705, wireless device 805, or a base station 105 as described herein, e.g., with reference to FIGS. 1 through 8. Device 1005 may include components for bi-directional voice and data communications including components for transmitting and receiving communications, including base station search space module 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

The base station search space module 1015 may perform one or more of the functions described with respect to the base station search space module 715, the base station search space module 815, and/or the base station search space module 915 described herein with reference to FIGS. 7 through 9.

Processor 1020 may include an intelligent hardware device (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting flexible search space configuration and overbooking handling).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic I/O system (BIOS) which may control basic hardware or software operation such as the interaction with peripheral components or devices.

Software 1030 may include code to implement aspects of the present disclosure, including code to support flexible search space configuration and overbooking handling. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described herein. For example, the transceiver 1035 may represent a wireless transceiver and may communicate bi-directionally with another wireless transceiver (e.g., at one or more UEs 115). The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network 130 (e.g., via one or more wired backhaul links). For example, the network communications manager 1045 may manage the transfer of data communications for client devices, such as one or more UEs 115.

Inter-station communications manager 1050 may manage communications with other base stations 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
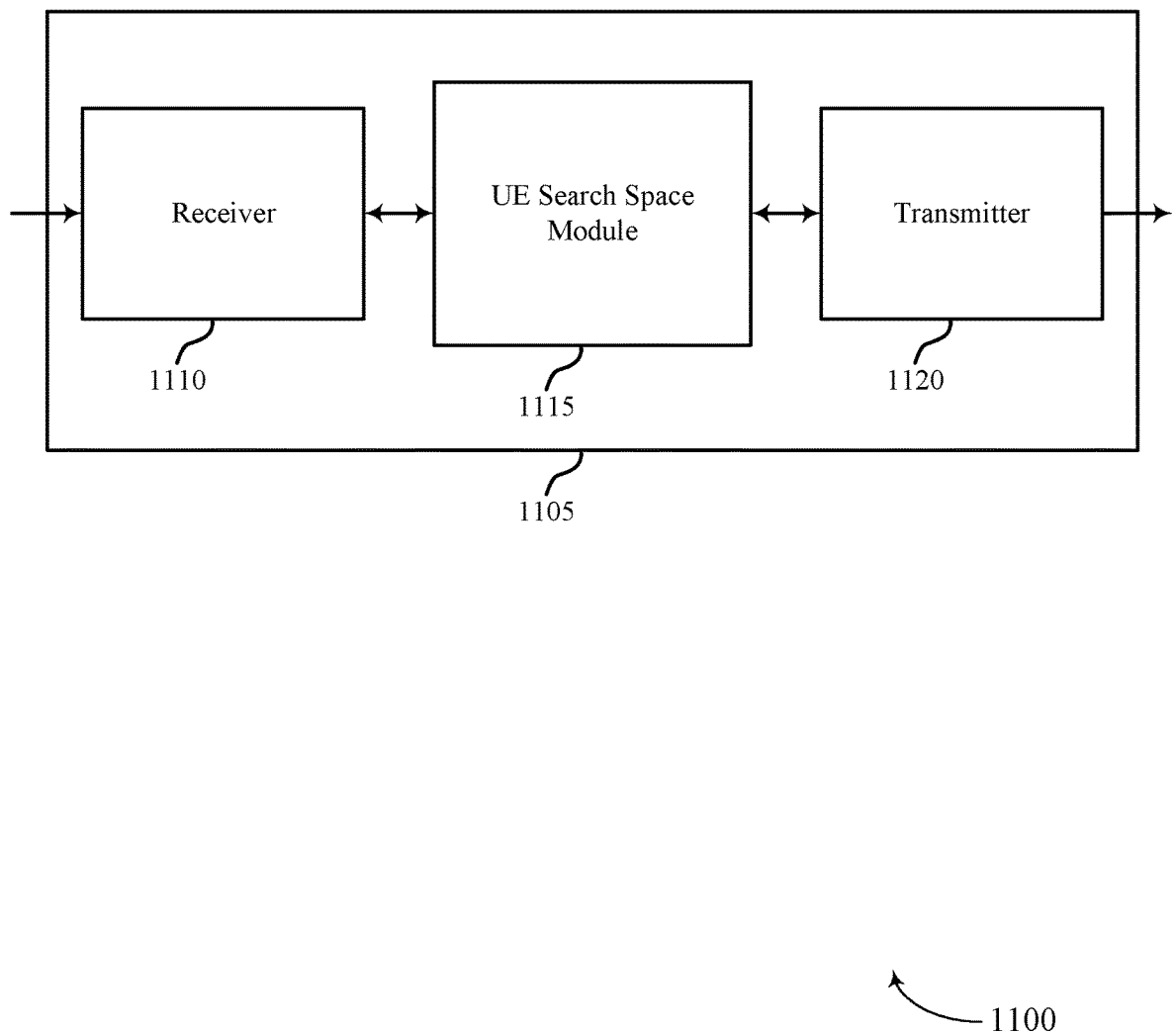
FIGS. 11 through 13 show block diagrams of a device that supports flexible search space configuration and overbooking handling in accordance with aspects of the present disclosure.

FIG. 11 shows a block diagram 1100 of a wireless device 1105 that supports flexible search space configuration and overbooking handling in accordance with aspects of the present disclosure. Wireless device 1105 may be an example of aspects of a UE 115 as described herein. Wireless device 1105 may include receiver 1110, UE search space module 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to flexible search space configuration and overbooking handling, etc.). Information may be passed on to other components of the device. The receiver 1110 may be an example of aspects of the transceiver 1435 described with reference to FIG. 14. The receiver 1110 may utilize a single antenna or a set of antennas.

UE search space module 1115 may be an example of aspects of the UE search space module 1415 described with reference to FIG. 14. UE search space module 1115 and/or at least some of its various sub-components may be implemented in hardware, software executed by a processor, firmware, or any combination thereof. If implemented in software executed by a processor, the functions of the UE search space module 1115 and/or at least some of its various sub-components may be executed by a general-purpose processor, a DSP, an ASIC, an FPGA or other PLD, discrete gate or transistor logic, discrete hardware components, or any combination thereof designed to perform the functions described in the present disclosure. The UE search space module 1115 and/or at least some of its various sub-components may be physically located at various positions, including being distributed such that portions of functions are implemented at different physical locations by one or more physical devices. In some examples, UE search space module 1115 and/or at least some of its various sub-components may be a separate and distinct component in accordance with various aspects of the present disclosure. In other examples, UE search space module 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, UE search space module 1115 may receive a configuration for a search space and may monitor, according to the configuration, for multiple sets of search space candidates within the search space, where each set of search space candidates corresponds to a different aggregation level of a set of aggregation levels. The UE search space module 1115 may identify one or more pseudo search space candidates corresponding to a reference aggregation level of the set of aggregation levels and may decode search space candidates within the search space except for the identified one or more pseudo search space candidates.

Additionally or alternatively, the UE search space module 1115 may receive a configuration for one or more CORESETs in a bandwidth part, where the one or more CORESETs contain one or more search space candidates, and may identify one or more dropped search space candidates of the one or more search space candidates based on the configuration, where a total number of remaining CCEs of the one or more CORESETs within a TTI is less than or equal to a CCE limit for the TTI. The UE search space module 1115 may monitor, according to the configuration, for one or more remaining search space candidates of the one or more search space candidates within the TTI based on the one or more dropped search space candidates and may decode the one or more remaining search space candidates.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
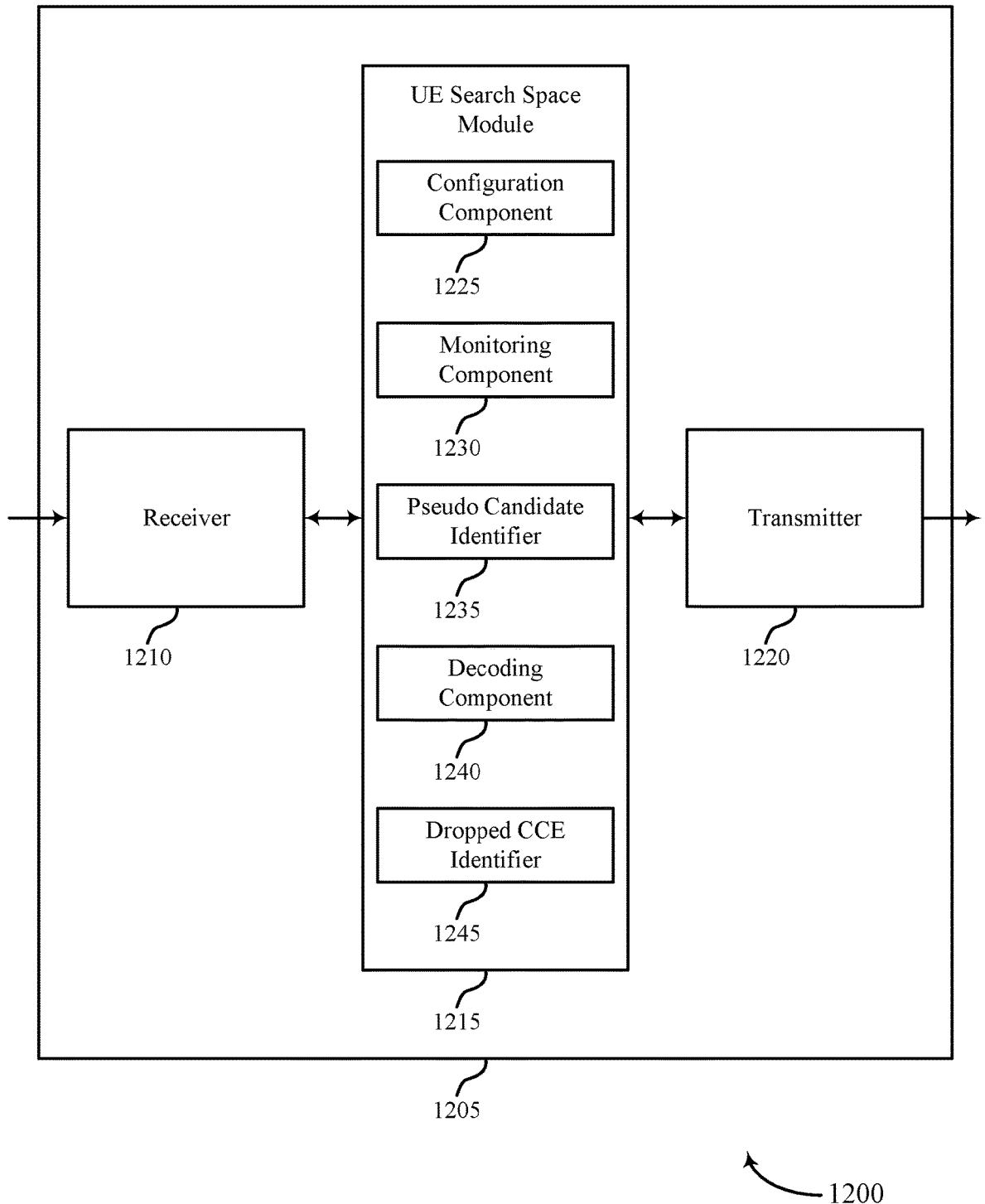

FIG. 12 shows a block diagram 1200 of a wireless device 1205 that supports flexible search space configuration and overbooking handling in accordance with aspects of the present disclosure. Wireless device 1205 may be an example of aspects of a wireless device 1105 or a UE 115 as described with reference to FIGS. 1 through 6 and 11. Wireless device 1205 may include receiver 1210, UE search space module 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to flexible search space configuration and overbooking handling, etc.). Information may be passed on to other components of the device. The receiver 1210 may be an example of aspects of the transceiver 1435 described with reference to FIG. 14. The receiver 1210 may utilize a single antenna or a set of antennas.

UE search space module 1215 may be an example of aspects of the UE search space module 1415 described with reference to FIG. 14. UE search space module 1215 may also include configuration component 1225, monitoring component 1230, pseudo candidate identifier 1235, decoding component 1240, dropped CCE identifier 1245, or some combination thereof.

Configuration component 1225 may receive a configuration for a search space. Monitoring component 1230 may monitor, according to the configuration, for multiple sets of search space candidates within the search space, where each set of search space candidates corresponds to a different aggregation level of a set of aggregation levels. Pseudo candidate identifier 1235 may identify one or more pseudo search space candidates corresponding to a reference aggregation level of the set of aggregation levels. Decoding component 1240 may decode search space candidates within the search space except for the identified one or more pseudo search space candidates.

In some cases, configuration component 1225 may receive a configuration for one or more CORESETs in a bandwidth part, where the one or more CORESETs contain one or more search space candidates. Dropped CCE identifier 1245 may identify one or more dropped search space candidates of the one or more search space candidates based on the configuration, where a total number of remaining CCEs of the one or more CORESETs within a TTI is less than or equal to a CCE limit for the TTI. Monitoring component 1230 may monitor, according to the configuration, for one or more remaining search space candidates of the one or more search space candidates within the TTI based on the dropped search space candidates. Decoding component 1240 may decode the one or more remaining search space candidates.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
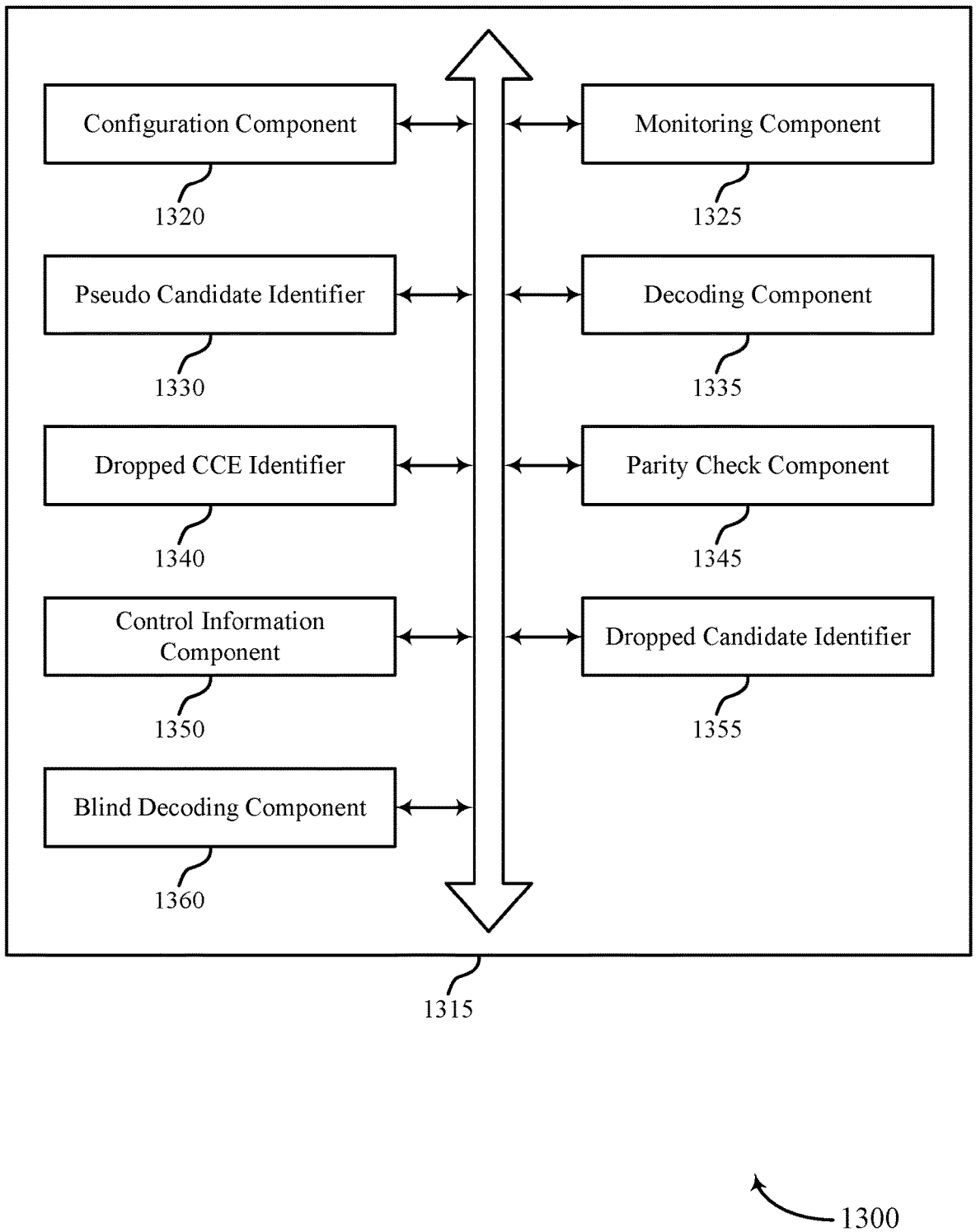

FIG. 13 shows a block diagram 1300 of a UE search space module 1315 that supports flexible search space configuration and overbooking handling in accordance with aspects of the present disclosure. The UE search space module 1315 may be an example of aspects of a UE search space module 1115, 1215, or 1415 described with reference to FIGS. 11, 12, and 14. The UE search space module 1315 may include configuration component 1320, monitoring component 1325, pseudo candidate identifier 1330, decoding component 1335, dropped CCE identifier 1340, parity check component 1345, control information component 1350, dropped candidate identifier 1355, blind decoding component 1360, or some combination thereof. Each of these modules may communicate, directly or indirectly, with one another (e.g., via one or more buses).

In a first implementation, configuration component 1320 may receive a configuration for a search space. In some cases, the search space corresponds to a CORESET. In some cases, the search space includes a CSS, a UE specific search space, or a combination thereof.

Monitoring component 1325 may monitor, according to the configuration, for multiple sets of search space candidates within the search space, where each set of search space candidates corresponds to a different aggregation level of a set of aggregation levels. In some cases, the multiple sets of search space candidates are nested within CCEs corresponding to the reference aggregation level. In some cases, the multiple sets of search space candidates include PDCCH candidates.

Pseudo candidate identifier 1330 may identify one or more pseudo search space candidates corresponding to a reference aggregation level of the set of aggregation levels. In some cases, the one or more pseudo search space candidates and a set of search space candidates corresponding to the reference aggregation level are mapped to the CCEs corresponding to the reference aggregation level. In some cases, the reference aggregation level is a highest aggregation level of the set of aggregation levels, a lowest aggregation level of the set of aggregation levels, a pre-defined aggregation level, or a combination thereof. Decoding component 1335 may decode search space candidates within the search space except for the identified one or more pseudo search space candidates.

In some cases, decoding the search space candidates may include decoding each search space candidate using a UE specific RNTI. Parity check component 1345 may perform a parity check on each decoded search space candidate. In some cases, the parity check may include a CRC. Control information component 1350 may determine control information based on the decoding if the parity check passes.

In a second implementation, configuration component 1320 may receive a configuration, such as a search space configuration for one or more CORESETs (e.g., in a bandwidth part). The one or more CORESETs may include one or more search space candidates. Each CORESET may include a CSS, one or more UE specific search spaces, or a combination of these. In some cases, the configuration includes an indication of priority values for the one or more CORESETs.

Dropped CCE identifier 1340 may identify one or more dropped search space candidates of the one or more search space candidates based on the configuration, where a total number of remaining CCEs of the one or more CORESETs within a TTI is less than or equal to a CCE limit for the TTI. In some cases, the identified one or more dropped search space candidates include a subset of CCEs of a CORESET of the one or more CORESETs. In other cases, the identified one or more dropped search space candidates include a CORESET of the one or more CORESETs. In yet other cases, the identified one or more dropped search space candidates include candidates of multiple CORESETs of the one or more CORESETs. In some cases, identifying the one or more dropped search space candidates is further based on an overbooking handling rule. For example, the one or more dropped search space candidates may be identified based on the priority values for the one or more CORESETs. In other examples, the one or more dropped search space candidates may be identified based on CORESET identifiers for the one or more CORESETs.

In some cases, identifying the one or more dropped search space candidates may include a dropped candidate identifier 1355 identifying a dropped search space candidate corresponding to the one or more dropped CCEs based on a CORESET identifier, an index of the dropped search space candidate, an aggregation level of the dropped search space candidate, a control information format associated with the dropped search space candidate, an RNTI, or a combination thereof.

Monitoring component 1325 may monitor, according to the configuration, for one or more remaining search space candidates of the one or more search space candidates within the TTI (e.g., the candidates remaining after dropping the one or more dropped search space candidates from the one or more search space candidates). In some cases, the TTI is an example of a symbol, a slot, a subframe, etc. Decoding component 1335 may decode the one or more remaining search space candidates. In some cases, decoding the remaining search space candidates may include blind decoding component 1360 performing blind decoding attempts for the one or more remaining search space candidates. In some cases, a total number of blind decoding attempts for decoding the remaining candidates within the TTI is less than or equal to a blind decoding attempt limit for the TTI.

Figure 14:
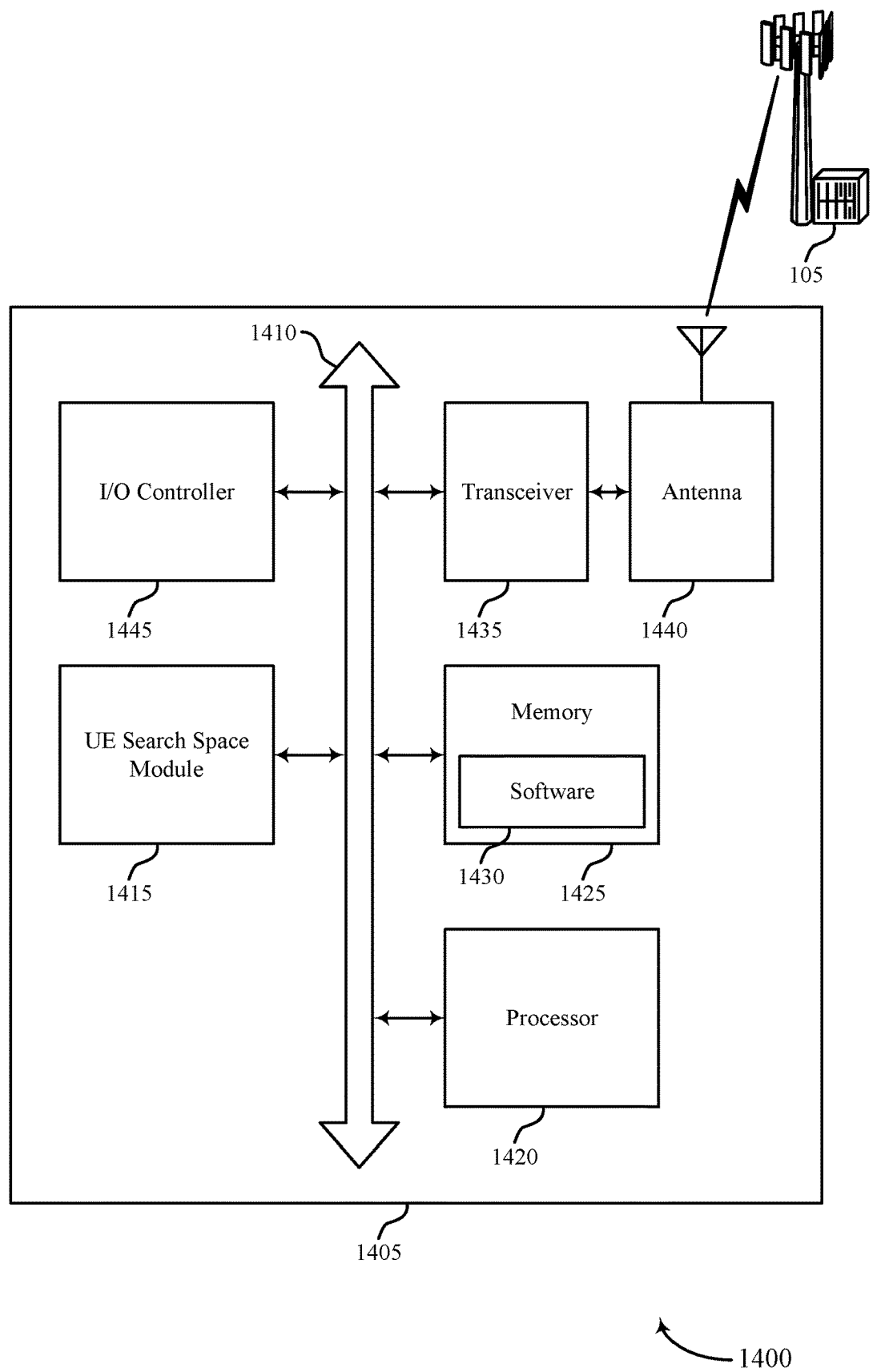
FIG. 14 illustrates a block diagram of a system including a user equipment (UE) that supports flexible search space configuration and overbooking handling in accordance with aspects of the present disclosure.

FIG. 14 illustrates a block diagram of a system 1400 including a device 1405 that supports flexible search space configuration and overbooking handling in accordance with aspects of the present disclosure. Device 1405 may be an example of or include the components of a UE 115 as described herein, e.g., with reference to FIGS. 1 through 6. Device 1405 may include components for bi-directional voice and data communications including components for transmitting and receiving communications, including UE search space module 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

The UE search space module 1415 may perform one or more of the functions described with respect to the UE search space module 1115, the UE search space module 1215, and/or the UE search space module 1315 described herein with reference to FIGS. 11 through 13.

Processor 1420 may include an intelligent hardware device (e.g., a general-purpose processor, a DSP, a CPU, a microcontroller, an ASIC, an FPGA, a PLD, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting flexible search space configuration and overbooking handling).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support flexible search space configuration and overbooking handling. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described herein. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
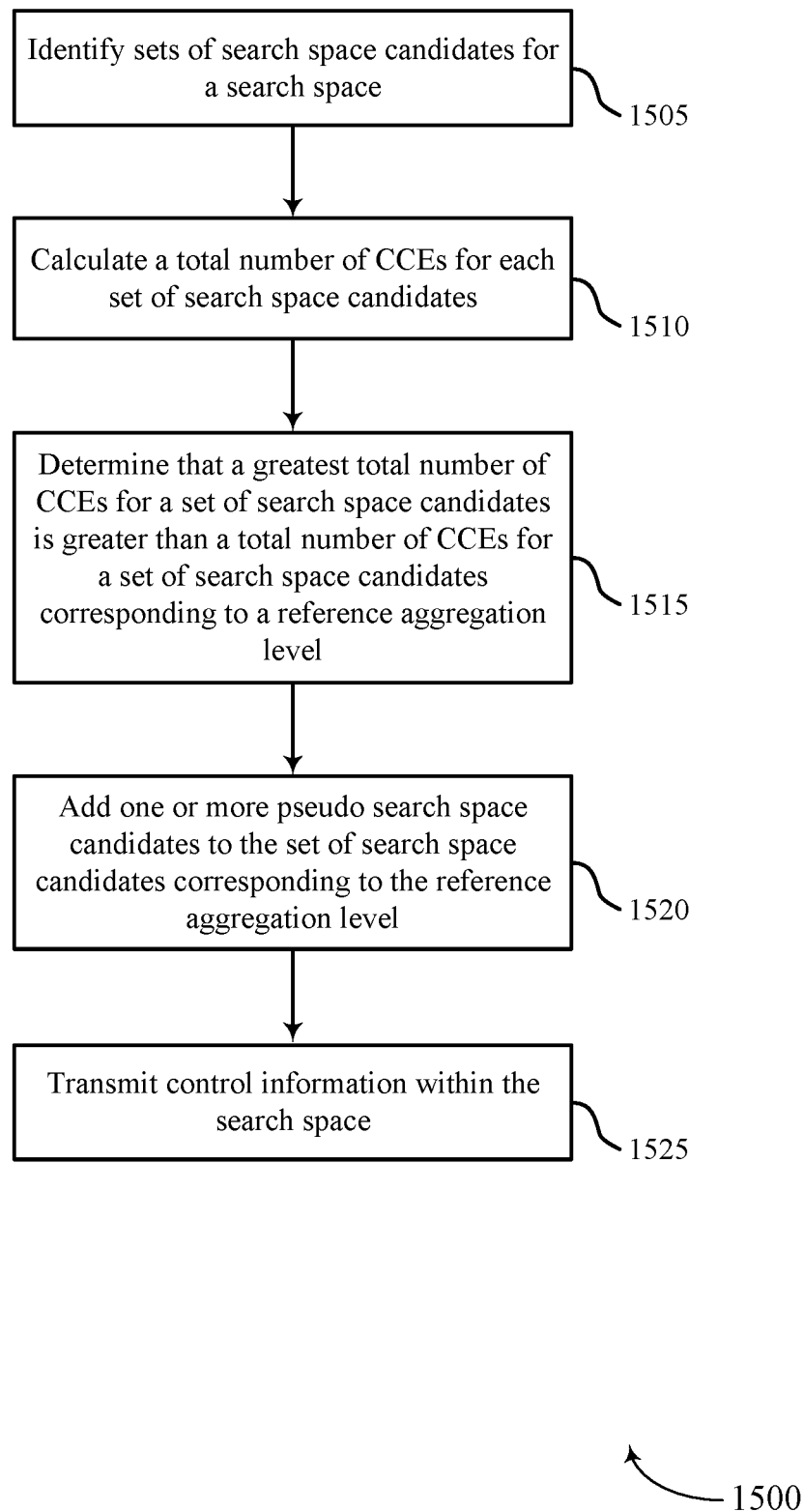
FIGS. 15 through 18 illustrate methods for flexible search space configuration and overbooking handling in accordance with aspects of the present disclosure.

FIG. 15 shows a flowchart illustrating a method 1500 for flexible search space configuration and overbooking handling in accordance with aspects of the present disclosure. The operations of method 1500 may be implemented by a base station 105 or its components as described herein. For example, the operations of method 1500 may be performed by a base station search space module as described with reference to FIGS. 7 through 10. In some examples, a base station 105 may execute a set of codes to control the functional elements of the device to perform the functions described herein. Additionally or alternatively, the base station 105 may perform aspects of the functions described herein using special-purpose hardware.

At 1505 the base station 105 may identify multiple sets of search space candidates for a search space, where each set of search space candidates corresponds to a different aggregation level of a set of aggregation levels, and where the set of aggregation levels includes a reference aggregation level and one or more additional aggregation levels. The operations of 1505 may be performed according to the methods described herein. In certain examples, aspects of the operations of 1505 may be performed by a candidate identifier as described with reference to FIGS. 7 through 10.

At 1510 the base station 105 may calculate a total number of CCEs for each set of search space candidates. The operations of 1510 may be performed according to the methods described herein. In certain examples, aspects of the operations of 1510 may be performed by a CCE calculation component as described with reference to FIGS. 7 through 10.

At 1515 the base station 105 may determine that a greatest total number of CCEs for a set of search space candidates corresponding to an additional aggregation level is greater than a total number of CCEs for a set of search space candidates corresponding to the reference aggregation level. The operations of 1515 may be performed according to the methods described herein. In certain examples, aspects of the operations of 1515 may be performed by a comparing component as described with reference to FIGS. 7 through 10.

At 1520 the base station 105 may add one or more pseudo search space candidates to the set of search space candidates corresponding to the reference aggregation level until the total number of CCEs for the set of search space candidates corresponding to the reference aggregation level is greater than or equal to the greatest total number of CCEs for the set of search space candidates corresponding to the additional aggregation level. The operations of 1520 may be performed according to the methods described herein. In certain examples, aspects of the operations of 1520 may be performed by a pseudo candidate component as described with reference to FIGS. 7 through 10.

At 1525 the base station 105 may transmit control information within the search space. The operations of 1525 may be performed according to the methods described herein. In certain examples, aspects of the operations of 1525 may be performed by a control information component as described with reference to FIGS. 7 through 10.

Figure 16:
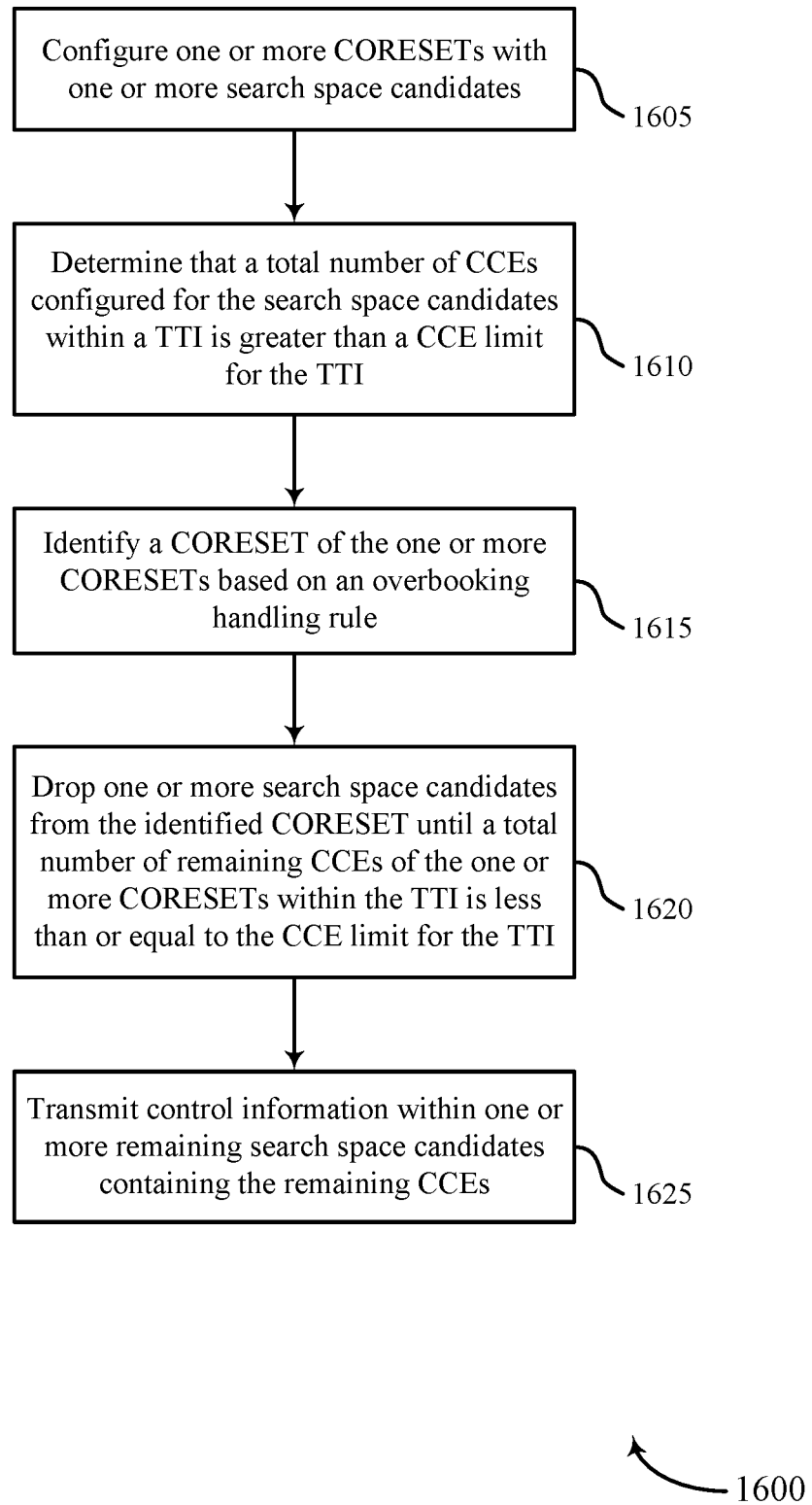

FIG. 16 shows a flowchart illustrating a method 1600 for flexible search space configuration and overbooking handling in accordance with aspects of the present disclosure. The operations of method 1600 may be implemented by a base station 105 or its components as described herein. For example, the operations of method 1600 may be performed by a base station search space module as described with reference to FIGS. 7 through 10. In some examples, a base station 105 may execute a set of codes to control the functional elements of the device to perform the functions described herein. Additionally or alternatively, the base station 105 may perform aspects of the functions described herein using special-purpose hardware.

At 1605 the base station 105 may configure one or more CORESETs in a bandwidth part. For example, the base station 105 may configure a UE 115 with one or more CORESETs containing one or more search space candidates. The operations of 1605 may be performed according to the methods described herein. In certain examples, aspects of the operations of 1605 may be performed by a configuration component as described with reference to FIGS. 7 through 10.

At 1610 the base station 105 may determine that a total number of CCEs configured for the one or more search space candidates within a TTI is greater than a CCE limit for the TTI. The operations of 1610 may be performed according to the methods described herein. In certain examples, aspects of the operations of 1610 may be performed by a limit comparison component as described with reference to FIGS. 7 through 10.

At 1615 the base station 105 may identify a CORESET of the one or more CORESETs based on an overbooking handling rule. The operations of 1615 may be performed according to the methods described herein. In certain examples, aspects of the operations of 1615 may be performed by a CORESET identifier as described with reference to FIGS. 7 through 10.

At 1620 the base station 105 may drop one or more search space candidates from the identified CORESET until a total number of remaining CCEs of the one or more CORESETs within the TTI is less than or equal to the CCE limit for the TTI. The operations of 1620 may be performed according to the methods described herein. In certain examples, aspects of the operations of 1620 may be performed by a CCE dropping component as described with reference to FIGS. 7 through 10.

At 1625 the base station 105 may transmit control information within one or more remaining search space candidates containing the remaining CCEs of the one or more CORESETs. The operations of 1625 may be performed according to the methods described herein. In certain examples, aspects of the operations of 1625 may be performed by a control information component as described with reference to FIGS. 7 through 10.

Figure 17:
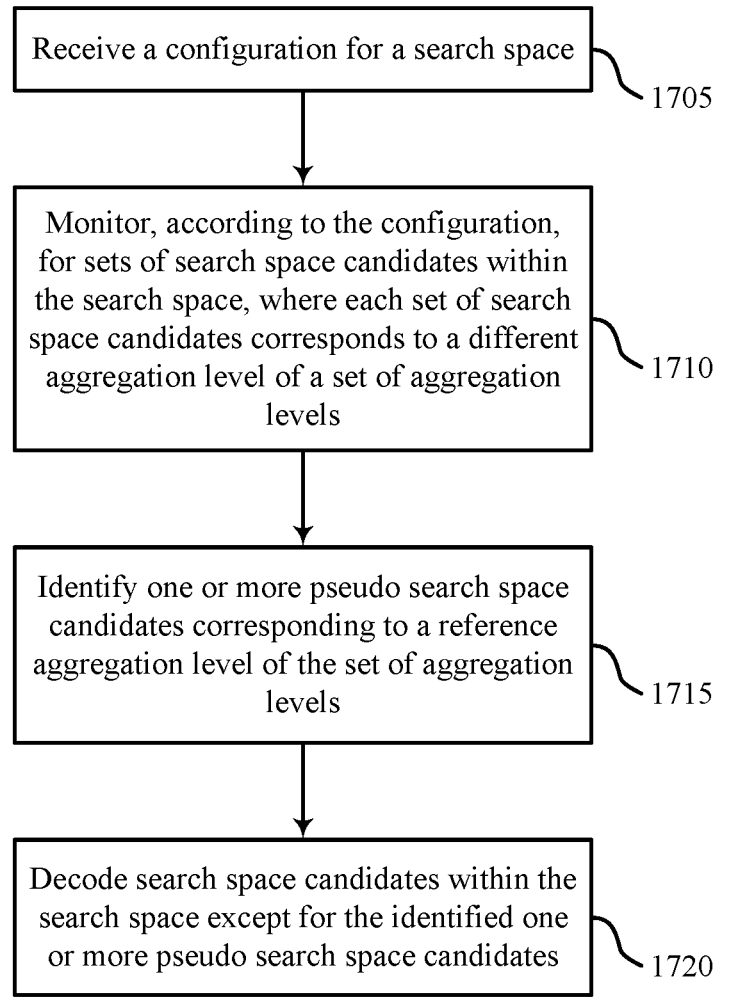

FIG. 17 shows a flowchart illustrating a method 1700 for flexible search space configuration and overbooking handling in accordance with aspects of the present disclosure. The operations of method 1700 may be implemented by a UE 115 or its components as described herein. For example, the operations of method 1700 may be performed by a UE search space module as described with reference to FIGS. 11 through 14. In some examples, a UE 115 may execute a set of codes to control the functional elements of the device to perform the functions described herein. Additionally or alternatively, the UE 115 may perform aspects of the functions described herein using special-purpose hardware.

At 1705 the UE 115 may receive a configuration for a search space. The operations of 1705 may be performed according to the methods described herein. In certain examples, aspects of the operations of 1705 may be performed by a configuration component as described with reference to FIGS. 11 through 14.

At 1710 the UE 115 may monitor, according to the configuration, for multiple sets of search space candidates within the search space, where each set of search space candidates corresponds to a different aggregation level of a set of aggregation levels. The operations of 1710 may be performed according to the methods described herein. In certain examples, aspects of the operations of 1710 may be performed by a monitoring component as described with reference to FIGS. 11 through 14.

At 1715 the UE 115 may identify one or more pseudo search space candidates corresponding to a reference aggregation level of the set of aggregation levels. The operations of 1715 may be performed according to the methods described herein. In certain examples, aspects of the operations of 1715 may be performed by a pseudo candidate identifier as described with reference to FIGS. 11 through 14.

At 1720 the UE 115 may decode search space candidates within the search space except for the identified one or more pseudo search space candidates. The operations of 1720 may be performed according to the methods described herein. In certain examples, aspects of the operations of 1720 may be performed by a decoding component as described with reference to FIGS. 11 through 14.

Figure 18:
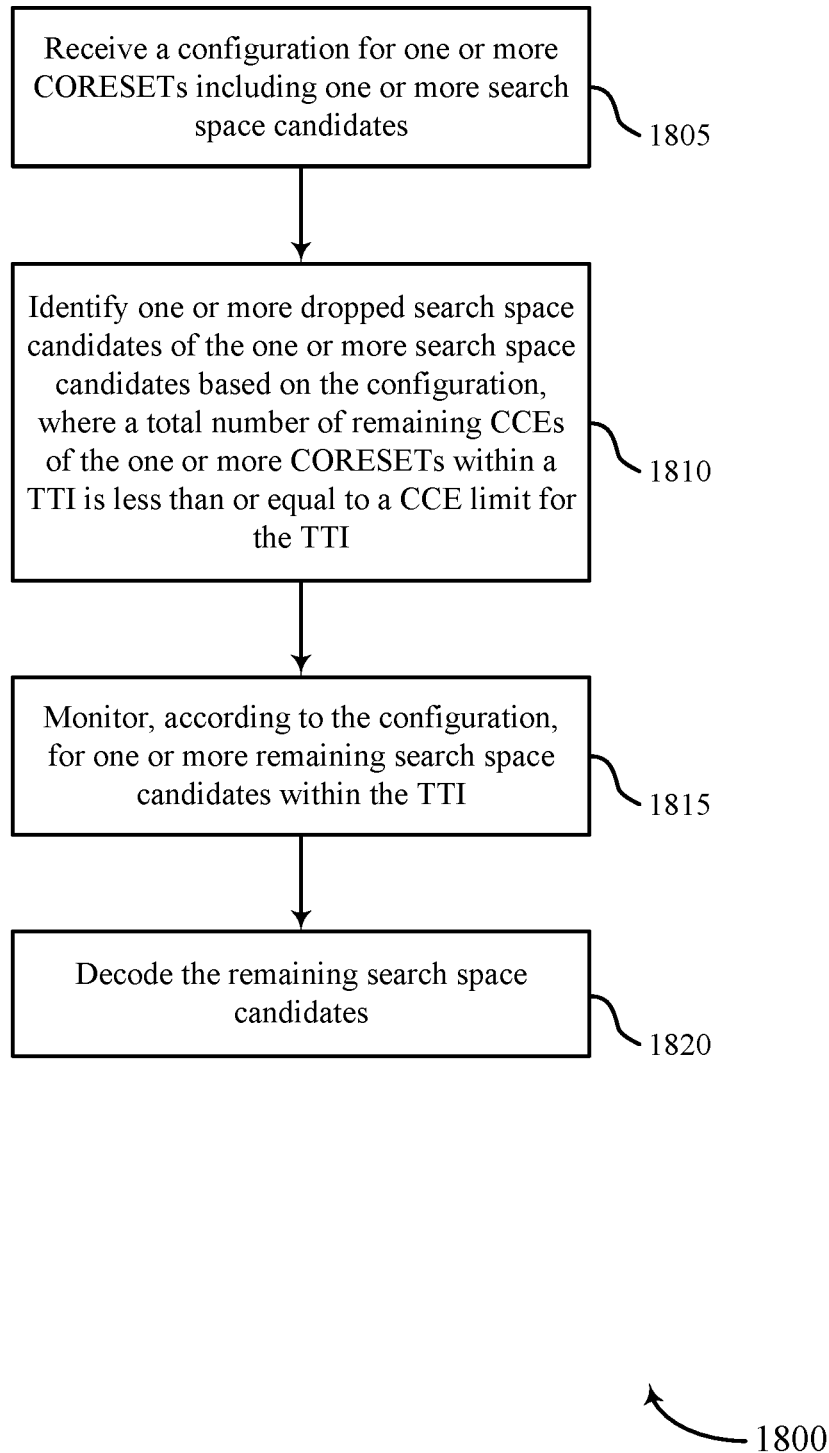

FIG. 18 shows a flowchart illustrating a method 1800 for flexible search space configuration and overbooking handling in accordance with aspects of the present disclosure. The operations of method 1800 may be implemented by a UE 115 or its components as described herein. For example, the operations of method 1800 may be performed by a UE search space module as described with reference to FIGS. 11 through 14. In some examples, a UE 115 may execute a set of codes to control the functional elements of the device to perform the functions described herein. Additionally or alternatively, the UE 115 may perform aspects of the functions described herein using special-purpose hardware.

At 1805 the UE 115 may receive a configuration for one or more CORESETs (e.g., in a bandwidth part). The one or more CORESETs may include one or more search space candidates. The operations of 1805 may be performed according to the methods described herein. In certain examples, aspects of the operations of 1805 may be performed by a configuration component as described with reference to FIGS. 11 through 14.

At 1810 the UE 115 may identify one or more dropped search space candidates of the one or more search space candidates based on the configuration, where a total number of remaining CCEs of the one or more CORESETs within a TTI is less than or equal to a CCE limit for the TTI. The operations of 1810 may be performed according to the methods described herein. In certain examples, aspects of the operations of 1810 may be performed by a dropped CCE identifier as described with reference to FIGS. 11 through 14.

At 1815 the UE 115 may monitor, according to the configuration, for one or more remaining search space candidates of the one or more search space candidates within the TTI based on the one or more dropped search space candidates. The operations of 1815 may be performed according to the methods described herein. In certain examples, aspects of the operations of 1815 may be performed by a monitoring component as described with reference to FIGS. 11 through 14.

At 1820 the UE 115 may decode the one or more remaining search space candidates. The operations of 1820 may be performed according to the methods described herein. In certain examples, aspects of the operations of 1820 may be performed by a decoding component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCS.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising: configuring a user equipment (UE) with one or more control resource sets (CORESETs) in a bandwidth part, wherein the one or more CORESETs comprise one or more search space candidates and one or more respective aggregation levels; determining that a total number of control channel elements (CCEs) configured for the one or more search space candidates within a transmission time interval (TTI) is greater than a CCE limit for the TTI, wherein the CCE limit is based at least in part on an aggregation level of the one or more respective aggregation levels;
    identifying a CORESET of the one or more CORESETs based at least in part on an overbooking handling rule associated with the aggregation level of the CORESET;
    dropping one or more search space candidates associated with the aggregation level from the identified CORESET until a total number of remaining CCEs of the one or more CORESETs within the TTI is less than or equal to the CCE limit for the TTI; and transmitting control information within one or more remaining search space candidates comprising the remaining CCEs of the one or more CORESETs.

2. The method of claim 1, wherein: the identified CORESET comprises a common search space (CSS), a UE specific search space, or a combination thereof; and the one or more search space candidates correspond to the CSS, the UE specific search space, or a combination thereof.

3. The method of claim 1, wherein at least one CORESET of the one or more CORESETs comprises a number of search space candidates that overlap in CCEs for different aggregation levels.

4. The method of claim 3, wherein dropping the search space candidates comprises: determining a search space candidate of the identified CORESET to drop; and dropping the determined search space candidate and any additional search space candidates that include CCEs overlapping with CCEs corresponding to the determined search space candidate.

5. The method of claim 1, further comprising: identifying an additional CORESET of the one or more CORESETs based at least in part on the overbooking handling rule; and dropping additional search space candidates from the identified additional CORESET until the total number of remaining CCEs of the one or more CORESETs within the TTI is less than or equal to the CCE limit for the TTI.

6. The method of claim 5, wherein identifying the additional CORESET is further based at least in part on dropping every search space candidate of the identified CORESET and determining that dropping the every search space candidate of the identified CORESET results in the total number of remaining CCEs of the one or more CORESETs within the TTI being greater than the CCE limit for the TTI.

7. The method of claim 5, wherein identifying the additional CORESET is further based at least in part on dropping a first search space candidate of the identified CORESET and determining that dropping the first search space candidate of the identified CORESET results in the total number of remaining CCEs of the one or more CORESETs within the TTI being greater than the CCE limit for the TTI.

8. The method of claim 1, further comprising: determining the search space candidates to drop based at least in part on candidate indices for the search space candidates, control information formats associated with the search space candidates, radio network temporary identifiers (RNTIs), or a combination thereof.

9. The method of claim 1, wherein dropping the search space candidates comprises: dropping a subset of CCEs of the identified CORESET or dropping the identified CORESET.

10. The method of claim 1, wherein identifying the CORESET based at least in part on the overbooking handling rule comprises: identifying the CORESET according to a priority value of the CORESET.

11. The method of claim 10, further comprising: transmitting an indication of priority values for the one or more CORESETs.

12. The method of claim 1, wherein identifying the CORESET based at least in part on the overbooking handling rule comprises: identifying the CORESET according to a CORESET identifier.

13. The method of claim 1, wherein identifying the CORESET based at least in part on the overbooking handling rule comprises: determining at least one CORESET of the one or more CORESETs that does not comprise a common search space; and identifying the CORESET from the determined at least one CORESET.

14. The method of claim 1, further comprising: determining that a total number of blind decoding attempts for decoding the remaining search space candidates is greater than a blind decoding attempt limit for the TTI; identifying one or more additional search space candidates of the one or more CORESETs to drop based at least in part on a blind decoding overbooking rule; and dropping the identified one or more additional search space candidates until the total number of blind decoding attempts for decoding the remaining search space candidates is less than or equal to the blind decoding attempt limit for the TTI.

15. The method of claim 14, wherein identifying the one or more additional search space candidates based at least in part on the blind decoding overbooking rule comprises: identifying each search space candidate of the one or more additional search space candidates according to a CORESET identifier, an index of the search space candidate, aggregation level of the search space candidate, a control information format associated with the search space candidate, a radio network temporary identifier (RNTI), or a combination thereof.

16. An apparatus for wireless communications, comprising: a processor; memory in electronic communication with the processor; and instructions stored in the memory and executable by the processor to cause the apparatus to: configure a user equipment (UE) with one or more control resource sets (CORESETs) in a bandwidth part, wherein the one or more CORESETs comprise one or more search space candidates and one or more respective aggregation levels; determine that a total number of control channel elements (CCEs) configured for the one or more search space candidates within a transmission time interval (TTI) is greater than a CCE limit for the TTI,
    wherein the CCE limit is based at least in part on an aggregation level of the one or more respective aggregation levels;
    identify a CORESET of the one or more CORESETs based at least in part on an overbooking handling rule associated with the aggregation level of the CORESET; drop one or more search space candidates associated with the aggregation level from the identified CORESET until a total number of remaining CCEs of the one or more CORESETs within the TTI is less than or equal to the CCE limit for the TTI; and transmit control information within one or more remaining search space candidates comprising the remaining CCEs of the one or more CORESETs.

17. The apparatus of claim 16, wherein: the identified CORESET comprises a common search space (CSS), a UE specific search space, or a combination thereof, and the one or more search space candidates correspond to the CSS, the UE specific search space, or a combination thereof.

18. The apparatus of claim 16, wherein the instructions are further executable by the processor to cause the apparatus to: determine the search space candidates to drop based at least in part on candidate indices for the search space candidates, control information formats associated with the search space candidates, radio network temporary identifiers (RNTIs), or a combination thereof.

* * * * *